(12) United States Patent
Hattori

(10) Patent No.: US 8,599,241 B2
(45) Date of Patent: Dec. 3, 2013

(54) INFORMATION PROCESSING APPARATUS, INFORMATION PROCESSING METHOD, PROGRAM, AND RECORDING MEDIUM

(75) Inventor: Shinobu Hattori, Tokyo (JP)

(73) Assignee: Sony Corporation, Tokyo (JP)

(*) Notice: Subject to any disclaimer, the term of this patent is extended or adjusted under 35 U.S.C. 154(b) by 242 days.

(21) Appl. No.: 12/995,621

(22) PCT Filed: Apr. 2, 2010

(86) PCT No.: PCT/JP2010/056081
§ 371 (c)(1),
(2), (4) Date: Mar. 8, 2011

(87) PCT Pub. No.: WO2010/116958
PCT Pub. Date: Oct. 14, 2010

(65) Prior Publication Data
US 2012/0113217 A1 May 10, 2012

(30) Foreign Application Priority Data

Apr. 8, 2009 (JP) ................................. 2009-093626
Mar. 19, 2010 (JP) ................................. 2010-065110

(51) Int. Cl.
*H04N 13/00* (2006.01)
*H04N 9/80* (2006.01)

(52) U.S. Cl.
USPC ............................................ 348/43; 386/241

(58) Field of Classification Search
USPC ........ 348/43, 42, 51, 53, 46, 47, 48; 386/246, 386/328, 355, 241; 375/240.01–240.26
See application file for complete search history.

(56) References Cited

U.S. PATENT DOCUMENTS 650,220 A 5/1900 Bates
5,923,869 A 7/1999 Kashiwagi et al.
(Continued)

FOREIGN PATENT DOCUMENTS

EP 0 888 018 A1 12/1998
JP 2007 166651 6/2007
(Continued)

OTHER PUBLICATIONS

International Search Report issued Jun. 22, 2010 in PCT/JP2010/056081 filed Apr. 2, 2010.
(Continued)

*Primary Examiner* — Behrooz Senfi
(74) *Attorney, Agent, or Firm* — Oblon, Spivak, McClelland, Maier & Neustadt, L.L.P.

(57) ABSTRACT

The present invention relates to an information processing apparatus, an information processing method, a program, and a recording medium that allow a reproducing apparatus to determine which one of a base stream and an enhancement stream obtained by encoding video data obtained from a plurality of viewpoints using a predetermined encoding method is a stream of a left image and which one is a stream of a right image. 3D_PL_type indicates the type of a PlayList. The value of the 3D_PL_type equal to "01" indicates a PLay-List for B-D1 reproduction of 3D reproduction. The value of the 3D_PL_type equal to "10" indicates a PLayList for B-D2 reproduction of 3D reproduction. view_type indicates whether the Base view video stream whose reproduction is managed using the PlayList is a stream of an L image (L view) or a stream of an R image (R view). The present invention is applicable to reproducing apparatuses that comply with the BD-ROM standard.

5 Claims, 28 Drawing Sheets

CAMERA FOR L IMAGE

SUBJECT

CAMERA FOR R IMAGE

(56) References Cited

U.S. PATENT DOCUMENTS

| | | |
|---|---|---|
| 6,393,574 B1 | 5/2002 | Kashiwagi et al. |
| 6,470,460 B1 | 10/2002 | Kashiwagi et al. |
| 6,484,266 B2 | 11/2002 | Kashiwagi et al. |
| 6,502,198 B2 | 12/2002 | Kashiwagi et al. |
| 6,502,199 B2 | 12/2002 | Kashiwagi et al. |
| 6,516,138 B2 | 2/2003 | Kashiwagi et al. |
| 6,516,139 B2 | 2/2003 | Kashiwagi et al. |
| 6,519,414 B2 | 2/2003 | Kashiwagi et al. |
| 6,526,226 B2 | 2/2003 | Kashiwagi et al. |
| 6,546,195 B2 | 4/2003 | Kashiwagi et al. |
| 6,573,819 B1 | 6/2003 | Oshima et al. |
| 6,574,423 B1 | 6/2003 | Oshima et al. |
| 6,907,190 B2 | 6/2005 | Kashiwagi et al. |
| 6,925,250 B1 | 8/2005 | Oshima et al. |
| 6,954,584 B2 | 10/2005 | Kashiwagi et al. |
| 7,194,194 B2 | 3/2007 | Kashiwagi et al. |
| 7,317,868 B2 | 1/2008 | Oshima et al. |
| 7,747,145 B2 | 6/2010 | Oshima et al. |
| 8,107,794 B2 | 1/2012 | Oshima et al. |
| 8,139,929 B2 | 3/2012 | Oshima et al. |
| 8,150,240 B2 | 4/2012 | Oshima et al. |
| 8,155,500 B2 | 4/2012 | Oshima et al. |
| 8,160,420 B2 | 4/2012 | Oshima et al. |
| 8,184,961 B2 | 5/2012 | Oshima et al. |
| 8,200,064 B2 | 6/2012 | Oshima et al. |
| 8,270,802 B2 | 9/2012 | Oshima et al. |
| 8,311,387 B2 | 11/2012 | Oshima et al. |
| 8,391,686 B2 | 3/2013 | Oshima et al. |
| 8,391,689 B2 | 3/2013 | Oshima et al. |
| 8,391,690 B2 | 3/2013 | Oshima et al. |
| 8,391,691 B2 | 3/2013 | Oshima et al. |
| 8,391,692 B2 | 3/2013 | Oshima et al. |
| 8,391,693 B2 | 3/2013 | Oshima et al. |
| 2001/0053281 A1 | 12/2001 | Kashiwagi et al. |
| 2001/0055474 A1 | 12/2001 | Kashiwagi et al. |
| 2002/0001454 A1 | 1/2002 | Kashiwagi et al. |
| 2002/0001455 A1 | 1/2002 | Kashiwagi et al. |
| 2002/0003944 A1 | 1/2002 | Kashiwagi et al. |
| 2002/0003945 A1 | 1/2002 | Kashiwagi et al. |
| 2002/0003950 A1 | 1/2002 | Kashiwagi et al. |
| 2002/0003951 A1 | 1/2002 | Kashiwagi et al. |
| 2002/0025143 A1 | 2/2002 | Kashiwagi et al. |
| 2003/0053797 A1 | 3/2003 | Oshima et al. |
| 2003/0108341 A1 | 6/2003 | Oshima et al. |
| 2003/0138238 A1 | 7/2003 | Kashiwagi et al. |
| 2004/0175133 A1 | 9/2004 | Kashiwagi et al. |
| 2004/0179820 A1 | 9/2004 | Kashiwagi et al. |
| 2005/0180735 A1 | 8/2005 | Oshima et al. |
| 2007/0172195 A1* | 7/2007 | Hattori et al. ............... 386/54 |
| 2008/0056686 A1 | 3/2008 | Oshima et al. |
| 2008/0063385 A1 | 3/2008 | Oshima et al. |
| 2008/0063386 A1 | 3/2008 | Oshima et al. |
| 2008/0101767 A1 | 5/2008 | Oshima et al. |
| 2008/0292287 A1 | 11/2008 | Oshima et al. |
| 2009/0220215 A1 | 9/2009 | Oshima et al. |
| 2009/0252483 A1 | 10/2009 | Oshima et al. |
| 2010/0020158 A1 | 1/2010 | Oshima et al. |
| 2010/0111503 A1 | 5/2010 | Oshima et al. |
| 2010/0119213 A1 | 5/2010 | Oshima et al. |
| 2011/0080468 A1 | 4/2011 | Oshima et al. |
| 2011/0116762 A1 | 5/2011 | Kato |
| 2011/0181695 A1 | 7/2011 | Oshima et al. |
| 2011/0181696 A1 | 7/2011 | Oshima et al. |
| 2011/0181697 A1 | 7/2011 | Oshima et al. |
| 2011/0181698 A1 | 7/2011 | Oshima et al. |
| 2011/0181699 A1 | 7/2011 | Oshima et al. |
| 2011/0181700 A1 | 7/2011 | Oshima et al. |
| 2011/0234751 A1 | 9/2011 | Oshima et al. |
| 2011/0234752 A1 | 9/2011 | Oshima et al. |
| 2011/0236001 A1 | 9/2011 | Oshima et al. |
| 2011/0279642 A1 | 11/2011 | Oshima et al. |
| 2012/0062711 A1* | 3/2012 | Ikeda et al. ............... 348/51 |
| 2012/0155830 A1* | 6/2012 | Sasaki et al. ............ 386/239 |
| 2012/0189276 A1 | 7/2012 | Oshima et al. |
| 2012/0189277 A1 | 7/2012 | Oshima et al. |
| 2012/0189278 A1 | 7/2012 | Oshima et al. |

FOREIGN PATENT DOCUMENTS

| | | |
|---|---|---|
| JP | 4564107 B2 | 10/2010 |
| SG | 167069 A1 | 1/2011 |
| WO | WO 2008/010932 A2 | 1/2008 |
| WO | 2010 038365 | 4/2010 |

OTHER PUBLICATIONS

"Advanced Video Coding For Generic Audiovisual Services: Series H: Audiovisual And Multimedia Systems, Infrastructure of Audiovisual Services—Coding of Moving Video", International Telecommunication Union, ITU-T Telecommunication Standardization Sector of ITU, H.264, pp. 596-647, (Mar. 2009).

Henrik Karppinen; "SEI Message to Indicate Stereo Video Information in Progressive H.264 Streams Input Document to JVT"; Joint Video Team (JVT) of ISO/IEC MPEG & ITU-T VCEG (ISO/IEC JTC1/SC29/WG11 and ITU-T SG16 Q.6), Redmond, USA; Jul. 19-23, 2004; 8 pages.

Anthony Vetro; "MVC Profile/Level Definitions for Stereo"; Joint Video Team (JVT) of ISO/IEC MPEG & ITU-T VCEG (ISO/IEC JTC1/SC29/WG11 and ITU-T SG16 Q.6); Hannover, DE; Jul. 20-25, 2008; 4 pages.

"Information Technology—Coding of Audio-Visual Objects—Part 15: Advanced Video Coding (AVC) File Format, Amendment 3: File Format Support for Multiview Video Coding", ISO/IEC JTC 1/SC 29 N; Oct. 17, 2008; ISO/IEC 14496-15:2004/PDAM 3, ISO/IEC JTC 1/SC 29/WG 11; 53 pages.

Office Action issued Dec. 7, 2012, in European Patent Application No. 10 761 657.5-2223 (6 pgs.).

Office Action issued Feb. 28, 2012, in Japanese Patent Application No. 2012-019825.

Office Action issued Feb. 28, 2012 in Japan Application No. 2010-065110 (With English Translation).

U.S. Appl. No. 13/816,247, filed Feb. 11, 2013, Hattori, et al.
U.S. Appl. No. 13/818,506, filed Feb. 22, 2013, Hattori, et al.
U.S. Appl. No. 13/816,249, filed Feb. 11, 2013, Hattori.
U.S. Appl. No. 13/816,591, filed Feb. 12, 2013, Hattori, et al.

Japanese Office Action issued Jan. 5, 2012, in Patent Application No. 2010-065110.

"Advanced video coding for generic audiovisual services: Series H: Audiovisual And Multimedia Systems, Infrastructure of Audiovisual Services—Coding of moving video", International Telecommunication Union, ITU-T Telecommunication Standardization Sector of ITU, H.264, (Mar. 2009), p. 365, 2 pages.

Extended European Search Report issued Apr. 12, 2012 in patent application No. 10761657.5.

Anthony Vetro, "MVC Profile/Level Definitions for Stereo", Joint Video Team (JVT) 28th Meeting, Joint Video Team of ISO/IEC MPEG & ITU-T VCEG (ISO/IEC JTC1/SC29/WG11 and ITU-T SG16 Q.6), No. JVT-AB037, XP030007423, Jul. 20, 2008, pp. 1-4.

U.S. Appl. No. 12/821,829, filed Jun. 23, 2010, Hattori, et al.

Combined Written Opinion and Search Report issued May 20, 2013 in Singapore Patent Application No. 201008820-1.

"Advanced Video Coding For Generic Audiovisual Services: Series H: Audiovisual And Multimedia Systems, Infrastructure of Audiovisual Services—Coding of Moving Video", International Telecommunication Union, ITU-T Telecommunication Standardization Sector of ITU, H.264, Mar. 2009, pp. i-647.

* cited by examiner

FIG. 8

PlayList-Syntax

| Syntax | No. of bits | Mnemonic |
|---|---|---|
| PlayList() { | | |
|     length | 32 | uimsbf |
|     reserved_for_future_use | 16 | bslbf |
|     number_of_PlayItems | 16 | uimsbf |
|     number_of_SubPaths | 16 | uimsbf |
|     for (PlayItem_id=0; | | |
|         PlayItem_id<number_of_PlayItems; | | |
|         PlayItem_id++) { | | |
|         PlayItem() | | |
|     } | | |
|     for (SubPath_id= 0; | | |
|         SubPath_id<number_of_SubPaths; | | |
|         SubPath_id++) { | | |
|         SubPath() | | |
|     } | | |
| } | | |

FIG. 9

SubPath-Syntax

| Syntax | No. of bits | Mnemonic |
|---|---|---|
| SubPath() { | | |
|     length | 32 | uimsbf |
|     reserved_for_future_use | 8 | bslbf |
|     SubPath_type | 8 | uimsbf |
|     reserved_for_future_use | 15 | uimsbf |
|     is_repeat_SubPath | 1 | bslbf |
|     reserved_for_future_use | 8 | bslbf |
|     number_of_SubPlayItems | 8 | uimsbf |
|     for (i=0;i< number_of_SubPlayItems;i++) { | | |
|         SubPlayItem(i) | | |
|     } | | |
| } | | |

FIG. 10

SubPath_type

| SubPath | Meaning |
|---|---|
| 0 | reserved |
| 1 | reserved |
| 2 | Out-of-mux and Audio presentation path of the Browsable slideshow (The audio presentation path using the SubPath is not synchronized with the main path using PlayItems in the PlayList.) |
| 3 | Out-of-mux and Interactive graphics presentation menu (The interactive graphics menu using the SubPath is not synchronized with the main path using PlayItems in the PlayList.) |
| 4 | Out-of-mux and Text subtitle presentation path (The text subtitle presentation path using the SubPath is synchronized with the main path using PlayItems in the PlayList.) |
| 5 | Out-of-mux and 2nd Audio Presentation path (The 2nd Audio Presentation path using the SubPath is synchronized with the main path using PlayItems in the PlayList.) |
| 6 | Out-of-mux and 2nd Video Presentation path (The 2nd Video Presentation path using the SubPath is synchronized with the main path using PlayItems in the PlayList.) |
| 7 | Out-of-mux and AV synchronized type of one or more elementary streams path (Primary audio/PG/IG/Secondary audio path.) Out-of-mux and AV synchronized type of Picture-in-Picture presentation path which contains one or more elementary stream paths. (The elementary streams used by the path are multiplexed in a separate Clip from other Clip used by PlayItem. The path using the SubPath is synchronized with the main path using PlayItems in the PlayList.) |
| 8 | Out-of mux MPEG-4 MVC Dependent video stream for 3D application path from Disc (The elementary stream used by the path are multiplexed in a separate Clip from Clip used by the associated PlayItem. The path using the SubPath is synchronized with the main path using PlayItems in the PlayList) |
| 9 | In-mux MPEG-4 MVC Dependent video stream for 3D application path from Disc (The elementary streams used by the path are multiplexed in the same Clip used by the associate PlayItem. The path using the SubPath is synchronized with the main path using PlayItems in the PlayList.) |
| 10 | Out-of mux MPEG-4 MVC Dependent video stream for 3D application path from Local Storage (The elementary stream used by the path are multiplexed in a separate Clip from Clip used by the associated PlayItem. The path using the SubPath is synchronized with the main path using PlayItems in the PlayList) |
| 11 | In-mux MPEG-4 MVC Dependent video stream for 3D application path from Local Storage (The elementary streams used by the path are multiplexed in the same Clip used by the associate PlayItem. The path using the SubPath is synchronized with the main path using PlayItems in the PlayList.) |
| 12-255 | reserved |

FIG. 11

SubPlayItem(i)-Syntax

| Syntax | No. of bits | Mnemonic |
|---|---|---|
| SubPlayItem(i) { | | |
|   length | 16 | uimsbf |
|   Clip_Information_file_name[0]    //subclip_entry_id=0 | 8*5 | bslbf |
|   Clip_codec_identifier[0] | 8*4 | bslbf |
|   reserved_for_future_use | 31 | bslbf |
|   is_multi_Clip_entries | 1 | bslbf |
|   ref_to_STC_id[0] | 8 | uimsbf |
|   SubPlayItem_IN_time | 32 | uimsbf |
|   SubPlayItem_OUT_time | 32 | uimsbf |
|   sync_PlayItem_id | 16 | uimsbf |
|   sync_start_PTS_of_PlayItem | 32 | uimsbf |
|   if(is_multi_Clip_entries==1b) { | | |
|     reserved_for_future_use | 8 | bslbf |
|     num_of_Clip_entries | 8 | uimsbf |
|     for(subclip_entry_id=1;//Note:Entries after subclip_entry_id=0 subclip_entry_id<num_of_Clip_entries;subclip_entry_id ++) { | | |
|       Clip_Information_file_name[subclip_entry_id] | 8*5 | bslbf |
|       Clip_codec_identifier[subclip_entry_id] | 8*4 | bslbf |
|       ref_to_STC_id[subclip_entry_id] | 8 | uimsbf |
|       reserved_for_future_use | 8 | bslbf |
|     } | | |
|   } | | |
| } | | |

FIG. 12

PlayItem-Syntax

| Syntax | No. of bits | Mnemonic |
|---|---|---|
| PlayItem() { | | |
|     length | 16 | uimsbf |
|     Clip_Information_file_name[0] | 8*5 | bslbf |
|     Clip_codec_identifier[0] | 8*4 | bslbf |
|     reserved_for_future_use | 11 | bslbf |
|     is_multi_angle | 1 | bslbf |
|     connection_condition | 4 | uimsbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_mode | 8 | uimsbf |
|     still_mode | 8 | uimsbf |
|     if(still_mode==0x1) { | | |
|         still_time | 16 | uimsbf |
|     }else{ | | |
|         reserved | 16 | bslbf |
|     } | | |
|     if(is_multi_angle==1b) { | | |
|         number_of_angles | 8 | uimsbf |
|         reserved_for_future_use | 7 | bslbf |
|         is_seamless_angle_change | 1 | uimsbf |
|         for(angle_id = 1; //Note: angles after angle_id=1 | | |
|         angle_id<number_of_angles; angle_id++) { | | |
|             Clip_Information_file_name[angle_id] | 8*5 | bslbf |
|             Clip_codec_identifier[angle_id] | 8*4 | bslbf |
|             ref_to_STC_id[angle_id] | 8 | uimsbf |
|             reserved_for_future_use | 16 | bslbf |
|         } | | |
|     } | | |
|     STN_table() | | |
| } | | |

FIG. 13

STN_table()

| Syntax | No.of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0; <br>         video_stream_id < number_of_video_stream_entries; <br>         video_stream_id++) { | | |
|         stream_entry() | | |
|         stream_attribute() | | |
|     } | | |
|     for (audio_stream_id=0; <br>         audio_stream_id < number_of_audio_stream_entries; <br>         audio_stream_id++) { | | |
|         stream_entry() | | |
|         stream_attributes() | | |
|     } | | |
|     for (audio_stream_id2=0; <br>         audio_stream_id2 < number_of_audio_stream2_entries; <br>         audio_stream_id2++) { | | |
|         stream_entry() | | |
|         stream_attributes() | | |
|     } | | |
|     for (PG_textST_stream_id=0; <br>         PG_textST_stream_id < number_of_PG_textST_stream_entries; <br>         PG_textST_stream_id++) { | | |
|         stream_entry() | | |
|         stream_attribute() | | |
|     } | | |
|     for (IG_stream_id=0; <br>         IG_stream_id < number_of_IG_stream_entries; <br>         IG_stream_id++) { | | |
|         stream_entry() | | |
|         stream_attribute() | | |
|     } | | |
| } | | |

FIG. 14

| application_type | meaning | Stream Input |
|---|---|---|
| 0 | reserved | |
| 1 | TS for Movie applications | These type of Clip AV stream files may be provided from either Disc or Local storage |
| 2 | TS for Time based slide show | |
| 3 | TS for a main-path of Browsable slide show | |
| 4 | TS for a sub-path of Browsable slide show | |
| 5 | TS for a sub-path of Interactive graphics menu | |
| 6 | TS for a sub-path of Text subtitle | |
| 7 | TS for a sub-path of one or more elementary streams path | This type of Clip AV stream file may be provided only from Local storage, shall not provided from Disc |
| 8 | TS for a sub-path of 3D application | The TS shall contain only the Dependent view video stream at one time, and shall not contain other elementary streams |
| 9-255 | reserved | |

FIG. 19

| Syntax | No. of bits | Mnemonic |
|---|---|---|
| xxxxx.mpls{ | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for(i=0; i<N1; i++) { | | |
|         padding_word | 16 | bslbf |
|     } | | |
|     PlayList() | | |
|     for(i=0; i<N2; i++) { | | |
|         padding_word | 16 | bslbf |
|     } | | |
|     PlayListMark() | | |
|     for(i=0; i<N3; i++) { | | |
|         padding_word | 16 | bslbf |
|     } | | |
|     ExtensionData() | | |
|     for(i=0; i<N4; i++) { | | |
|         padding_word | 16 | bslbf |
|     } | | |
| } | | |

FIG. 20

| xxxxx.mpls{ | | | |
|---|---|---|---|
| ... snip ... | | | |
| 3D_PL_type | 2 | | |
| if(3D_PL_type==01b‖3D_PL_type==10) { | | | |
| view_type | 1 | | |
| reserved_for_future_use | 157 | | |
| } else { | | | |
| reserved_for_future_use | 158 | | |
| } | | | |
| ... snip ... | | | |
| } | | | |

FIG. 21

| 3D_PL_type | Meaning |
|---|---|
| 00 | 2D PlayList |
| 01 | 3D B-D1 PlayList |
| 10 | 3D B-D2 PlayList |

FIG. 22

| view_type (is_L_Base_view_flag) | Meaning |
|---|---|
| 0 | L view or 2D AVC video stream |
| 1 | R view |

FIG. 29

```
program_stream_map () {
  ...
  for (i=0; i<N; i++) {
    descriptor ()
  }
  ...
  for (i=0; i<N2; i++) {
    descriptor ()
  }
}
```

```
MVC_video_stream_descriptor () {
  descriptor_tag
  descriptor_length
  view_type
  ...
}
```

INFORMATION PROCESSING APPARATUS, INFORMATION PROCESSING METHOD, PROGRAM, AND RECORDING MEDIUM

TECHNICAL FIELD

The present invention relates to an information processing apparatus, an information processing method, a program, and a recording medium and, in particular, to an information processing apparatus, an information processing method, a program, and a recording medium that allow a reproducing apparatus to determine which one of a base stream and an enhancement stream obtained by encoding multi-view video data using a predetermined encoding method is a stream of a left image and which one is a stream of a right image.

BACKGROUND ART

In general, two-dimensional image content, such as motion pictures, is popular. However, recently, 3D image content that allows users to view a three-dimensional image has attracted attention.

To display 3D images, a dedicated device is necessary. An example of such a device is an IP (Integral Photography) 3D image system developed by NHK (Japan Broadcasting Corporation).

Image data of a 3D image includes image data obtained from multi-view image data (the image data of images captured from a plurality of viewpoints). As the number of viewpoints increases and the viewpoints are distributed over a wider range, a subject can be viewed from a variety of directions. Thus, a so-called "look-in TV" can be realized.

Among 3D images, an image having the least number of viewpoints is a stereo image having two viewpoints (a so-called 3D image). The image data of a stereo image includes data of a left image to be viewed by the left eye and data of a right image to be viewed by the right eye.

In addition, high-resolution image content, such as a motion picture, has a large amount of data. In order to record such content having a large amount of data, a high-capacity recording medium is necessary.

Examples of such a high-capacity recording medium includes Blu-Ray® disc (hereinafter also referred to as a "BD"), such as a BD (Blu-Ray®)-ROM (Read Only Memory).

CITATION LIST

Patent Literature

PTL 1: Japanese Unexamined Patent Application Publication No. 2007-095249

SUMMARY OF INVENTION

Technical Problem

However, in the BD standard, a method describing how image data of a 3D image including a stereo image is recorded and reproduced is not defined.

Even when the management information of image data defined by the existing BD standard is directly used, the data of a stereo image cannot be reproduced.

Accordingly, the present invention allows a reproducing apparatus to determine which one of a base stream and an enhancement stream obtained by encoding multi-view video data using a predetermined encoding method is a stream of a left image and which one is a stream of a right image.

Solution to Problem

According to an aspect of the present invention, an information processing apparatus includes encoding means for encoding multi-view video data using a predetermined encoding method and generating means for generating viewpoint information indicating which one of a base stream and an enhancement stream obtained through encoding performed by the encoding means is a stream of a left image and which one is a stream of a right image.

The generating means can generate reproduction control information used for controlling reproduction of the base stream and the enhancement stream, and the reproduction control information can include the viewpoint information. In this case, the information processing apparatus can further include recording means for recording the reproduction control information generated by the generating means on a recording medium together with the base stream and the enhancement stream.

The generating means can generate transmission control information that includes the viewpoint information and that is used for controlling transmission of the base stream and the enhancement stream.

The generating means can generate transmission control information that includes the viewpoint information and that is used for controlling transmission of the base stream and the enhancement stream.

The generating means can generate identification information indicating whether information is used for controlling reproduction of a two-dimensional image or a three-dimensional image, generate first reproduction control information that includes the identification information indicating information used for controlling reproduction of a two-dimensional image and that controls reproduction of the base stream, and generate second reproduction control information that includes the identification information indicating information used for controlling reproduction of a three-dimensional image and that controls reproduction of the base stream and the enhancement stream.

The generating means can set information regarding reproduction of the enhancement stream in an extended field of the second reproduction control information.

According to an aspect of the present invention, an information processing method includes the steps of encoding multi-view video data using a predetermined encoding method and generating viewpoint information indicating which one of a base stream and an enhancement stream obtained through encoding performed by the encoding means is a stream of a left image and which one is a stream of a right image.

According to an aspect of the present invention, a program includes program code for causing a computer to perform a process including the steps of encoding multi-view video data using a predetermined encoding method and generating viewpoint information indicating which one of a base stream and an enhancement stream obtained through the encoding is a stream of a left image and which one is a stream of a right image.

According to an aspect of the present invention, a recording medium stores a base stream and an enhancement stream obtained by encoding multi-view video data using a predetermined encoding method and reproduction control information that includes viewpoint information indicating which one of a base stream and an enhancement stream is a stream of a left image and which one is a stream of a right image and that is used for controlling reproduction of the base stream and the enhancement stream.

According to an aspect of the present invention, viewpoint information indicating which one of a base stream and an enhancement stream obtained through encoding performed by the encoding means is a stream of a left image and which one is a stream of a right image is generated.

Advantageous Effects of Invention

According to the present invention, the information processing apparatus allows a reproducing apparatus to determine which one of a base stream and an enhancement stream obtained by encoding multi-view video data using a predetermined encoding method is a stream of a left image and which one is a stream of a right image.

BRIEF DESCRIPTION OF DRAWINGS

FIG. 8 illustrates the syntax of a PlayList file.
FIG. 9 illustrates the syntax of SubPath( ) shown in FIG. 8.
FIG. 10 illustrates an example of SubPath_type.
FIG. 11 illustrates the syntax of SubPlayItem(i) shown in FIG. 9.
FIG. 12 illustrates the syntax of PlayItem( ) shown in FIG. 8.
FIG. 13 illustrates the syntax of STN_table( ) shown in FIG. 12.
FIG. 14 illustrates an example of application_type.
FIG. 19 illustrates the syntax of the PlayList file.
FIG. 20 illustrates how to use reserved_for_future_use shown in FIG. 19.
FIG. 21 illustrates the meaning of the values of 3D_PL_type.
FIG. 22 illustrates the meaning of the values of view_type.

FIG. 29 illustrates an example in which the view_type is written in a PMT.

DESCRIPTION OF EMBODIMENTS

Example of Configuration of Reproducing System

Figure 1:
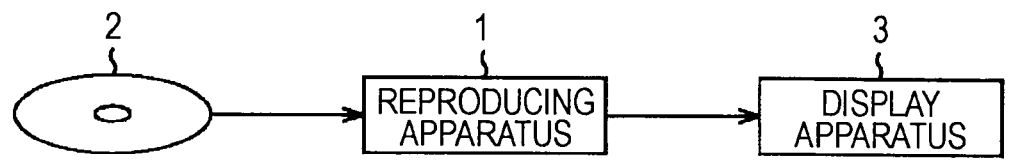
FIG. 1 illustrates an example of the configuration of a reproducing system including a reproducing apparatus according to the present invention.

FIG. 1 illustrates an example of the configuration of a reproducing system including a reproducing apparatus 1 according to the present invention.

As shown in FIG. 1, the reproducing system includes the reproducing apparatus 1 and a display apparatus 3 connected to each other using, for example, an HDMI (High Definition Multimedia Interface) cable. An optical disk 2, such as a BD, is mounted in the reproducing apparatus 1.

On the optical disk 2, streams necessary for displaying a stereo image having two viewpoints (widely referred to as a "3D image") are recorded.

The reproducing apparatus 1 serves as a player for reproducing a 3D image from the streams recorded on the optical disk 2. The reproducing apparatus 1 reproduces the streams recorded in the optical disk 2 and causes the display apparatus 3, such as a television receiver, to display the reproduced 3D image. Similarly, sound is reproduced by the reproducing apparatus 1 and is output from, for example, a speaker included in the display apparatus 3.

A variety of methods for displaying a 3D image have been developed. In this example, in order to display a 3D image, the following display methods of type 1 and type 2 are employed.

In the display method of type 1, 3D image data includes the data of images viewed by the left eye (L images) and the data of images viewed by the right eye (R images). By alternately displaying the L images and R images, a 3D image is displayed.

In the display method of type 2, a 3D image is displayed by L images and R images generated by using data of an original image (i.e., an image from which the 3D image is to be generated) and Depth data. The 3D image data used in the display method of type 2 includes the data on the original image and the Depth data. By providing the Depth data to the original image, the L and R images can be generated.

In the display method of type 1, eyeglasses are required when a user views a 3D image. However, in the display method of type 2, a user can view a 3D image without wearing eyeglasses.

The optical disk 2 includes a stream with which a 3D image can be displayed by using any one of the display methods of type 1 and type 2.

In order to record such a stream on the optical disk 2, the H.264 AVC (Advanced Video Coding)/MVC (Multi-view Video Coding) profile standard, for example, is used as an encoding method.

[H.264 AVC/MVC Profile]

In the H.264 AVC/MVC Profile standard, an image stream called "Base view video" and an image stream called "Dependent view video" are defined. Hereinafter, the H.264 AVC/MVC Profile standard is simply referred to as "MVC" as appropriate.

Figure 2:
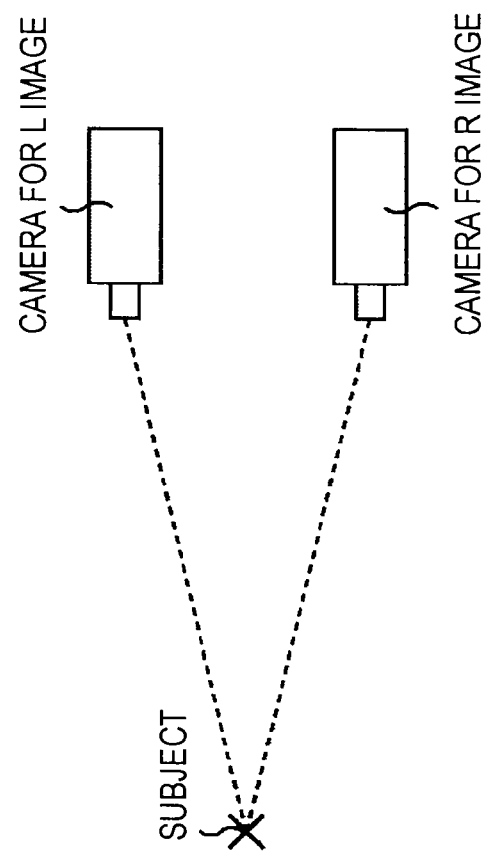
FIG. 2 illustrates an example of image capturing.

FIG. 2 illustrates an example of image capturing.

As shown in FIG. 2, the same subject is captured by a camera for an L image and a camera for an R image. Elementary streams of the video captured by the camera for an L image and the camera for an R image are input to an MVC encoder.

Figure 3:
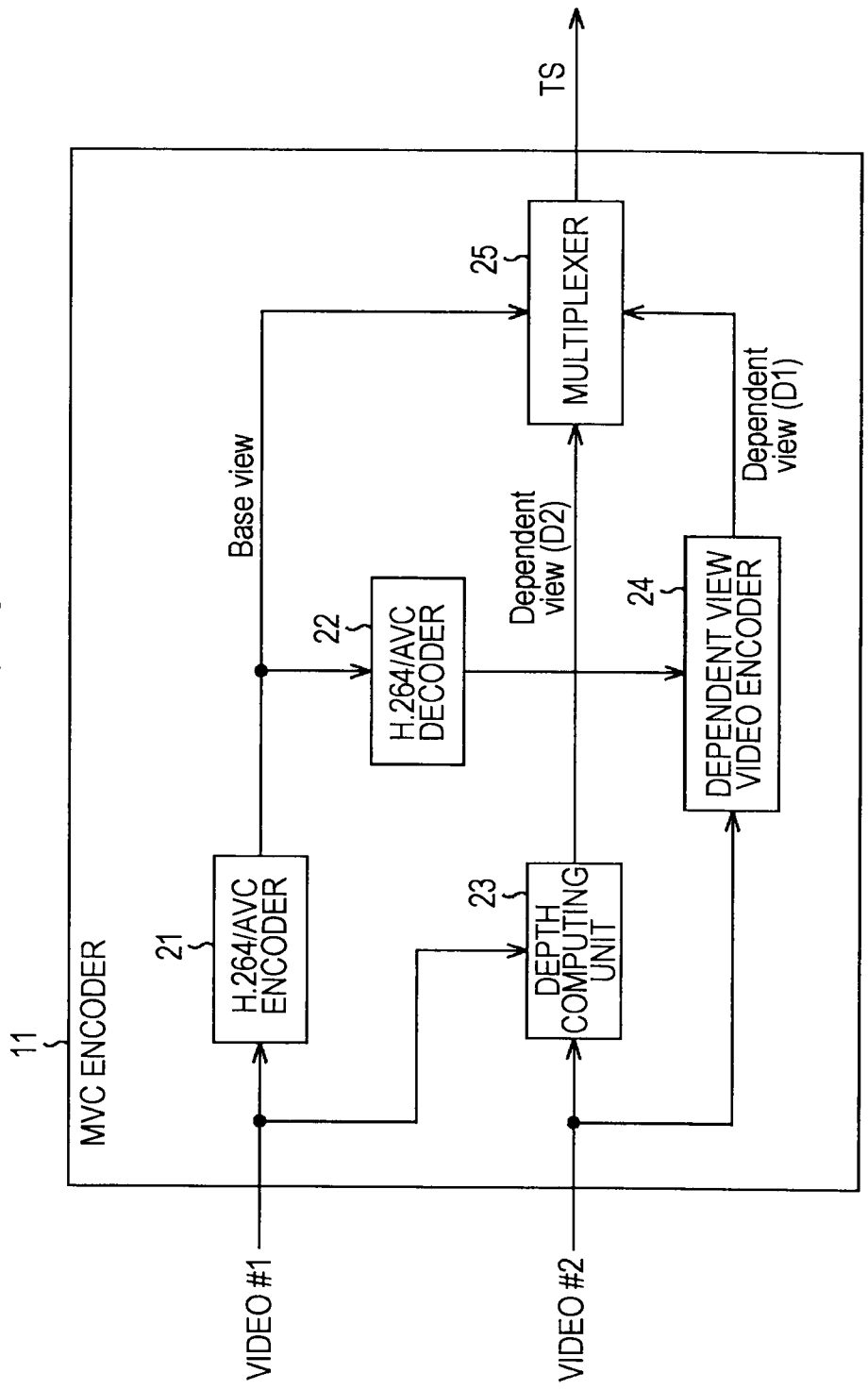
FIG. 3 is a block diagram illustrating an example of the configuration of an MVC encoder.

FIG. 3 is a block diagram illustrating an example of the configuration of the MVC encoder.

As shown in FIG. 3, an MVC encoder 11 includes an H.264/AVC encoder 21, an H.264/AVC decoder 22, a Depth computing unit 23, a Dependent view video encoder 24, and a multiplexer 25.

A stream of video #1 captured by the camera for an L image is input to the H.264/AVC encoder 21 and the depth computing unit 23. In addition, a stream of video #2 captured by the camera for an R image is input to the depth computing unit 23 and the Dependent view video encoder 24. Alternatively, the stream of the video #2 may be input to the H.264/AVC encoder 21 and the depth computing unit 23, and the stream of the video #1 may be input to the depth computing unit 23 and the dependent view video encoder 24.

The H.264/AVC encoder 21 encodes the stream of the video #1 into, for example, an H.264 AVC/High Profile video stream. The H.264/AVC encoder 21 outputs the encoded AVC video stream to the H.264/AVC decoder 22 and the multiplexer 25 in the form of a Base view video stream.

The H.264/AVC decoder 22 decodes the AVC video stream supplied from the H.264/AVC encoder 21 and outputs a stream of the video #1 obtained through the decoding operation to the Dependent view video encoder 24.

The depth computing unit 23 computes the Depth on the basis of the stream of the video #1 and the stream of the video #2 and outputs the computed Depth to the multiplexer 25.

The Dependent view video encoder 24 encodes the stream of the video #1 supplied from the H.264/AVC decoder 22 and the stream of the video #2 input externally and outputs a Dependent view video stream.

Figure 4:
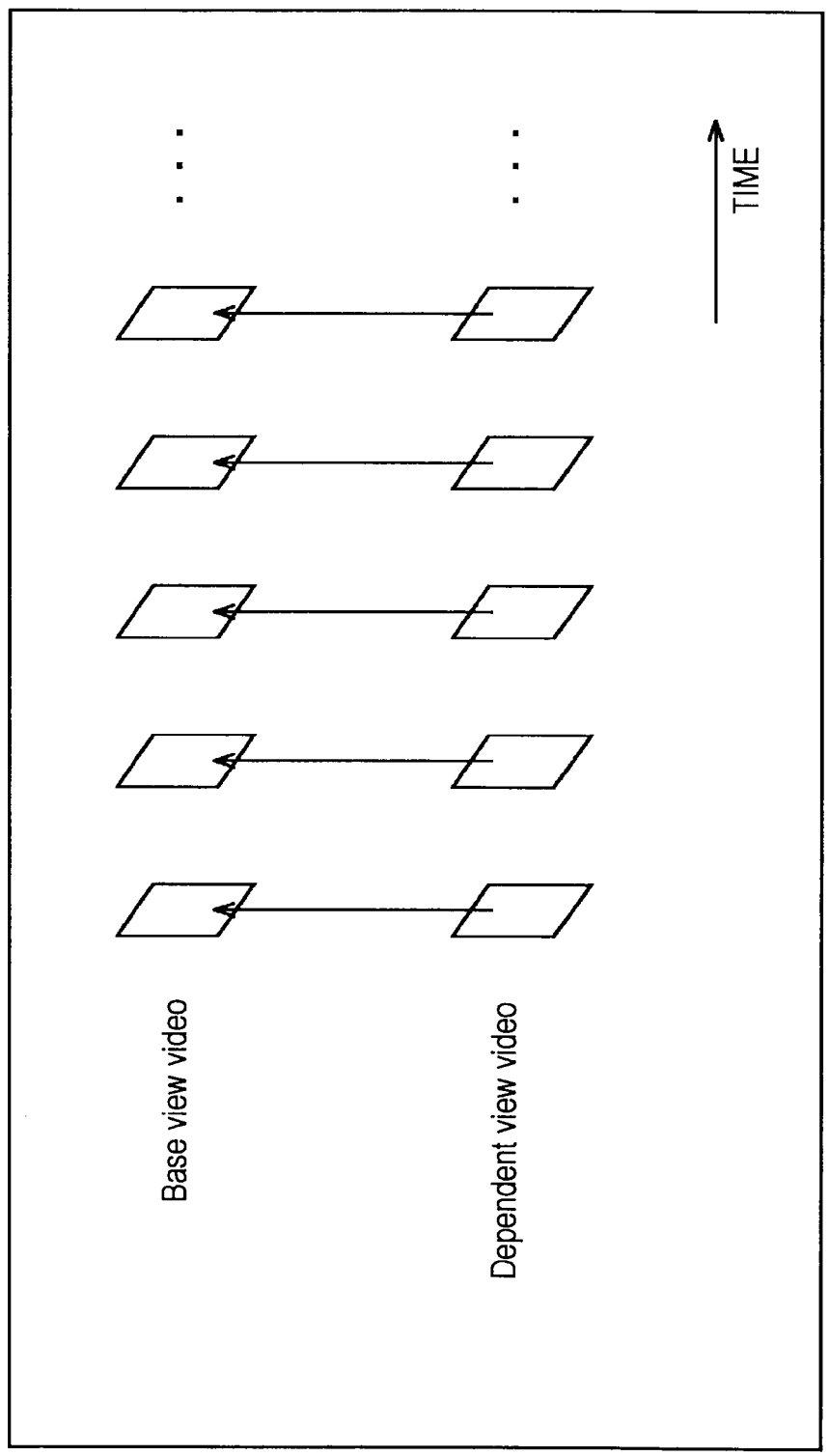
FIG. 4 illustrates an example of a reference image.

Predictive encoding in which a different stream is used as a reference image is not allowed for the Base view video. However, as shown in FIG. 4, the Dependent view video is allowed to be predictive encoded using the Base view video as a reference image. For example, when encoding is performed in which an L image is used as Base view video and an R image is used as Dependent view video, the amount of data of an obtained Dependent view video stream is smaller than that of an obtained Base view video.

Note that since the encoding is performed using H.264/AVC, prediction is performed for the Base view video in the time direction as well. Furthermore, prediction is performed for the Dependent view video in the time direction in addition to prediction between views. In order to decode Dependent view video, the corresponding Base view video that was referenced at the time of encoding needs to be decoded in advance.

The Dependent view video encoder 24 outputs, to the multiplexer 25, such a Dependent view video stream obtained through an encoding operation using prediction between the views.

The multiplexer 25 multiplexes the Base view video stream supplied from the H.264/AVC encoder 21, the Dependent view video stream (data regarding the Depth) supplied from the depth computing unit 23, and the Dependent view video stream supplied from the Dependent view video encoder 24 in the form of, for example, MPEG2 TS. The Base view video stream and the Dependent view video stream may be multiplexed into one MPEG2 TS. Alternatively, the Base view video stream and the Dependent view video stream may be included in different MPEG2 TSs.

The multiplexer 25 outputs the generated TS (MPEG2 TS). The TS output from the multiplexer 25 is recorded on the optical disk 2 by a recording apparatus together with additional management data. The optical disk 2 including such data recorded thereon is supplied to the reproducing apparatus 1.

If the Dependent view video used together with the Base view video in the display method of type 1 needs to be differentiated from the Dependent view video (the Depth) used together with the Base view video in the display method of type 2, the former is referred to as a "D1 view video" and the latter is referred to as a "D2 view video".

In addition, 3D reproduction using the display method of type 1 based on the Base view video and D1 view video is referred to as "B-D1 reproduction". 3D reproduction using the display method of type 2 based on the Base view video and D2 view video is referred to as "B-D2 reproduction".

When the reproducing apparatus 1 makes B-D1 reproduction in response to, for example, a user instruction, the reproducing apparatus 1 reads the Base view video stream and the D1 view video stream from the optical disk 2 and reproduces the Base view video stream and the D1 view video stream.

In addition, when the reproducing apparatus 1 makes B-D2 reproduction, the reproducing apparatus 1 reads the Base view video stream and the D2 view video stream from the optical disk 2 and reproduces the Base view video stream and the D2 view video stream.

Furthermore, when the reproducing apparatus 1 makes ordinary 2D image reproduction, the reproducing apparatus 1 reads only the Base view video stream from the optical disk 2 and reproduces the Base view video.

The Base view video stream is an AVC video stream encoded using H.264/AVC. Accordingly, any player that supports a BD format can reproduce the Base view video stream and can display the 2D image.

The case in which the Dependent view video represents D1 view video is mainly described below. In the following description, the term "Dependent view video stream" refers to D1 view video. Like D1 view video, D2 view video is recorded on the optical disk 2 and is reproduced.

[Application Format]

Figure 5:
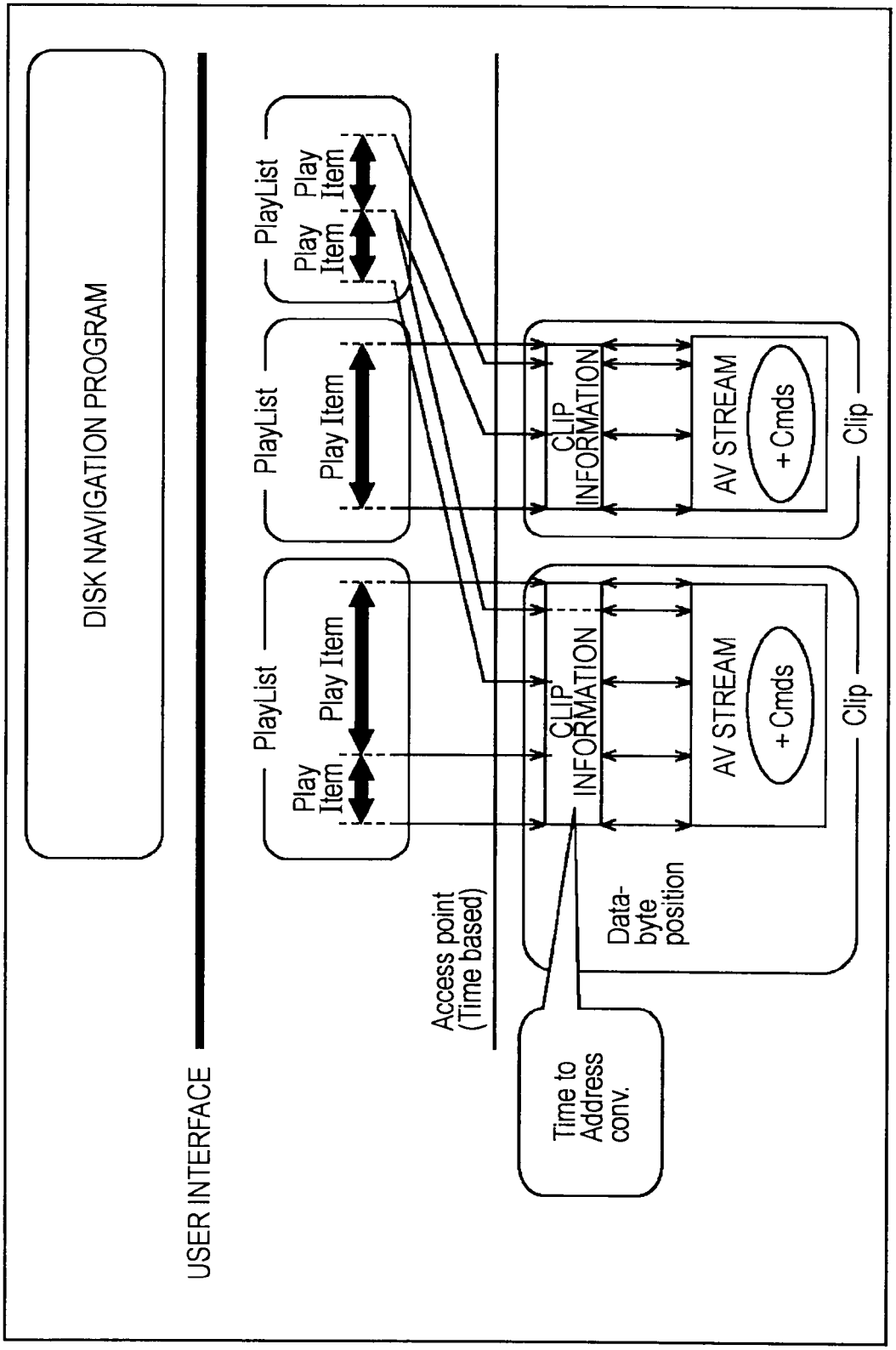
FIG. 5 illustrates an example of management of an AV stream.

FIG. 5 illustrates an example of management of an AV stream performed by the reproducing apparatus 1.

As shown in FIG. 5, management of an AV stream is performed using two layers: Playlist and Clip. An AV stream may be recorded in a local storage of the reproducing apparatus 1 in addition to the optical disk 2.

Here, a pair consisting of an AV stream and Clip Information accompanied by the AV stream is considered as an object. The object is referred to as "Clip". Hereinafter, a file storing an AV stream is referred to as an "AV stream file". In addition, a file storing Clip Information is referred to as a "Clip Information file".

An AV stream is expanded on a time axis. In general, an access point of each Clip is specified using a timestamp in the Playlist. A Clip Information file is used for determining an address of the AV stream at which decoding is to be started.

A Playlist is a collection of intervals of an AV stream to be reproduced. One reproduction interval in an AV stream is referred to as a "PlayItem". The PlayItem is defined by using a pair consisting of an IN point and an OUT point of the reproduction interval on a time axis. As shown in FIG. 5, the PlayList includes one or a plurality of PlayItems.

In FIG. 5, a first PlayList from the left includes two PlayItems. The two PlayItems refer to the first half and second half of the AV stream included in the left Clip.

A second PlayList from the left includes one PlayItem. The PlayItem refers to the entirety of the AV stream included in the right Clip.

A third PlayList from the left includes two PlayItems. The two PlayItems refer to a portion of the AV stream included in the left Clip and a portion of the AV stream included in the right Clip.

For example, when the left PlayItem included in the first PlayList from the left is specified as a reproduction point by a disk navigation program, the first half of the AV stream included in the left Clip, which is referenced by the PlayItem, is reproduced. As described above, the PlayList is used as reproduction management information for managing reproduction of AV streams.

In a PlayList, a reproduction path formed by one or more continuous PlayItems is referred to as a "Main Path".

In addition, in a PlayList, a reproduction path formed by one or more continuous SubPlayItems that is parallel to the Main Path is referred to as a "Sub Path".

Figure 6:
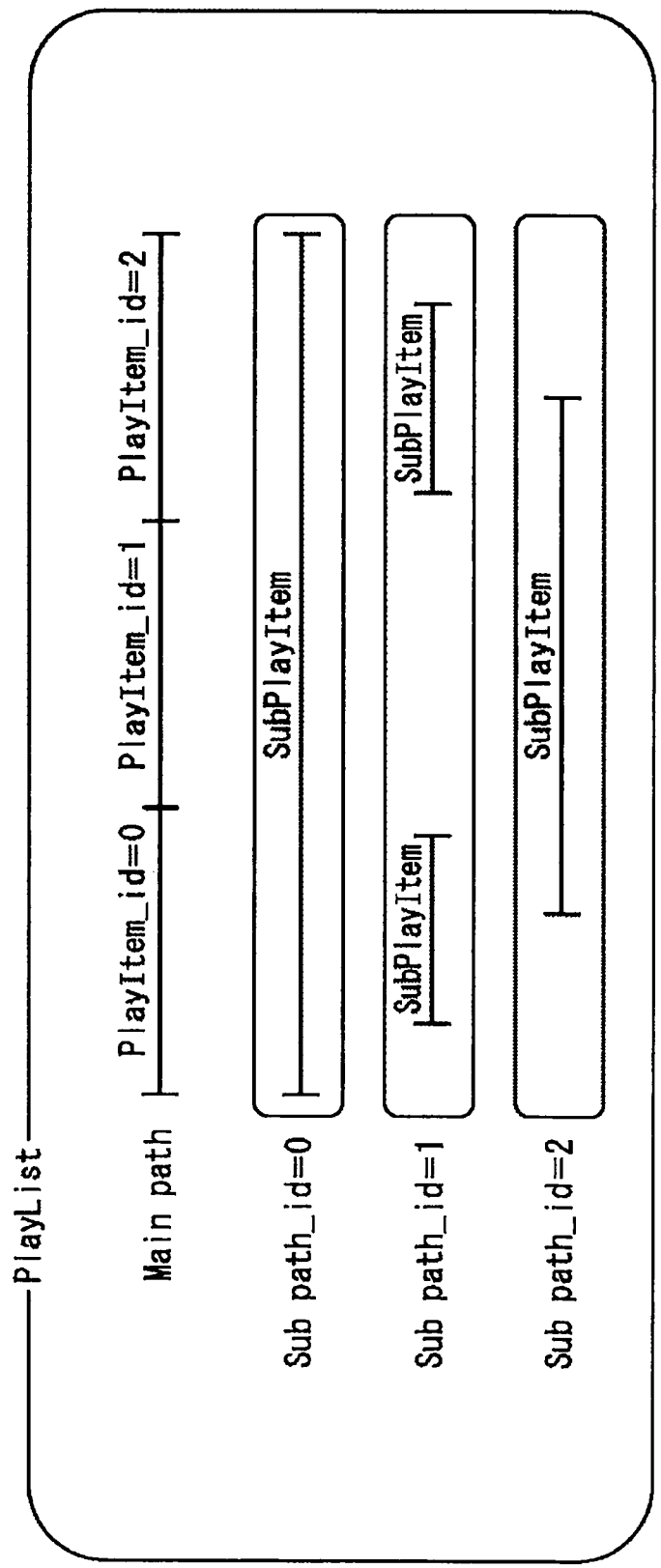
FIG. 6 illustrates the structures of a Main Path and a Sub Path.

FIG. 6 illustrates the structures of the Main Path and the Sub Path.

A PlayList can include a Main Path and one or more Sub Paths.

The above-described Base view video stream is managed as a stream referenced by a PlayList that forms a Main Path. In addition, the Dependent view video stream is managed as a stream referenced by a SubPlayList that forms a Sub Path.

In FIG. 6, the PlayList includes one Main Paths, which is formed from three continuous PlayItems, and three Sub Paths.

IDs are sequentially assigned to the PlayItems that form the Main Path from the first PlayItem. Similarly, IDs are sequentially assigned to the Sub Paths from the first Sub Path such that Subpath_id=0, Subpath_id=1, and Subpath_id=2.

In the example shown in FIG. 6, the Sub Path having Subpath_id=0 includes one SubPlayItem, and the Sub Path having Subpath_id=1 includes two SubPlayItems. Furthermore, the Sub Path having Subpath_id=2 includes one SubPlayItem.

A Clip AV stream that is referenced by a PlayItem includes at least a video stream (main image data).

In addition, the Clip AV stream may or may not include one or more audio streams to be reproduced at the same time as (in synchronization with) reproduction of the video stream included in the Clip AV stream.

The Clip AV stream may or may not include one or more bitmap caption data streams (PG (Presentation Graphic) streams) to be reproduced in synchronization with reproduction of the video stream included in the Clip AV stream.

The Clip AV stream may or may not include one or more IG (Interactive Graphic) streams to be reproduced in synchronization with reproduction of the video stream included in the Clip AV stream. The IG stream is used to display graphics, such as buttons to be operated by a user.

In a Clip AV stream referenced by one PlayItem, the following streams are multiplexed: a video stream, zero, one, or more audio streams to be reproduced in synchronization with reproduction of the video stream, zero, one, or more PG streams, and zero, one, or more IG streams.

In addition, a SubPlayItem refers to, for example, a video stream, an audio stream, or a PG stream of a stream different from the Clip AV stream which is referenced by the PlayItem (a different stream).

Such an AV stream management method using the PlayList, PlayItem, and SubPlayItem is described in, for example, Japanese Unexamined Patent Application Publication Nos. 2008-252740 and 2005-348314.

[Directory Structure]

Figure 7:
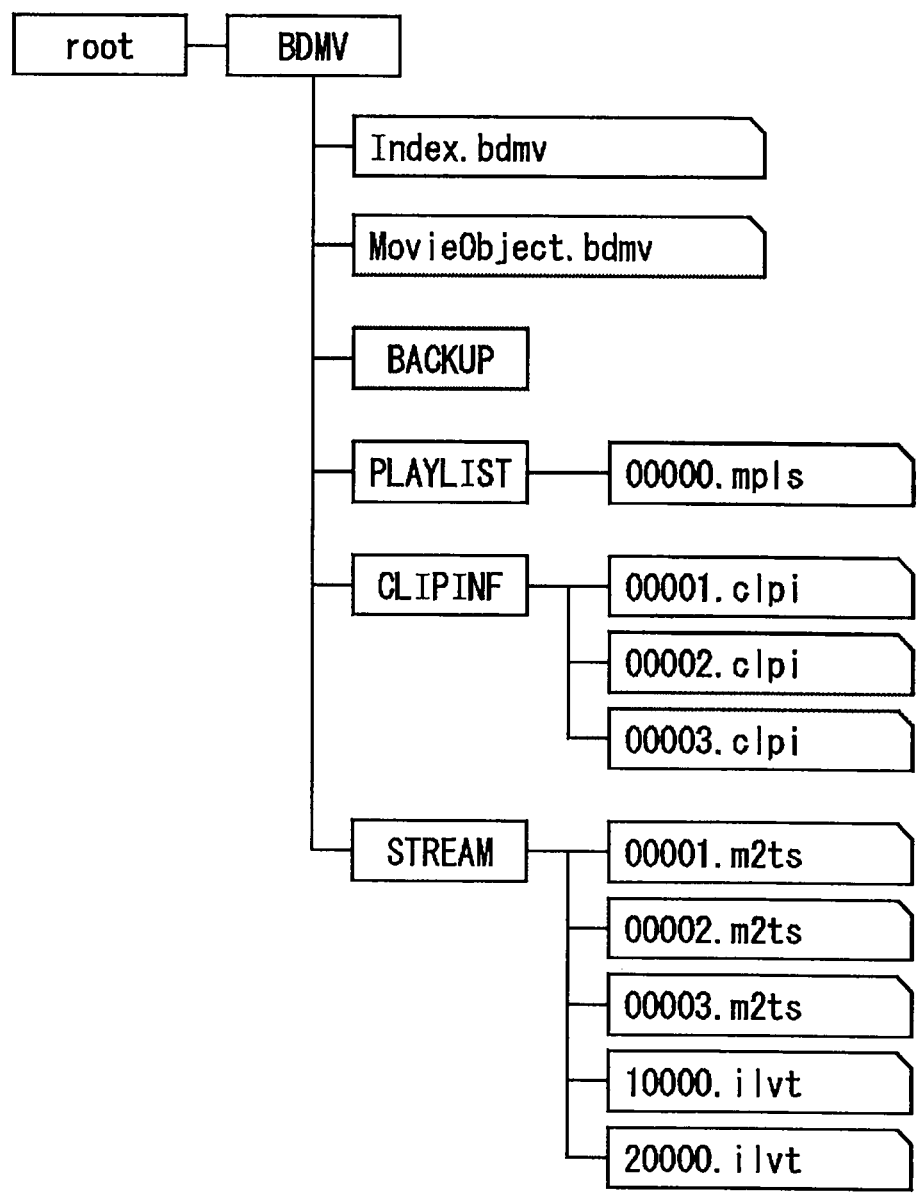
FIG. 7 illustrates an example of the management structure of a file recorded on an optical disk.

FIG. 7 illustrates an example of the management structure of a file recorded on the optical disk 2.

As shown in FIG. 7, files are hierarchically managed using a directory structure. One root directory is generated in the optical disk 2. Under a root directory, files are managed by a single recording and reproducing system.

Under a root directory, a BDMV directory is set.

Immediately beneath the BDMV directory, an Index file having a name of "Index.bdmv" and a MovieObject file having a name of "MovieObject.bdmv" are stored.

Under the BDMV directory, a BACKUP directory, a PLAYLIST directory, a CLIPINF directory, and a STREAM directory are provided.

In the PLAYLIST directory, PlayList files each including a PlayList are stored. A name formed from a combination of 5-digit number and an extension ".mpls" is given to each of the PlayList files. The PlayList file shown in FIG. 7 has the file name "00000.mpls" assigned thereto.

In the CLIPINF directory, Clip Information files are stored. A name formed from a combination of 5-digit number and an extension ".clipi" is given to each of the Clip Information files.

In FIG. 7, three Clip Information files have file names "00001.clipi", "00002.clipi", and "00003.clipi". Hereinafter, a Clip Information file is referred to a "clpi file" as appropriate.

For example, a clpi file having a name of "00001.clpi" includes information regarding the Clip of the Base view video.

A clpi file having a name of "00002.clpi" includes information regarding the Clip of the D2 view video.

A clpi file having a name of "00003.clpi" includes information regarding the Clip of the D1 view video.

Stream files are stored in the STREAM directory. A name formed from a combination of 5-digit number and an extension ".m2ts" or a combination of 5-digit number and an extension ".ilvt" is given to each of the stream files. Hereinafter, a file having an extension of ".m2ts" is referred to an "m2ts file" as appropriate. In addition, a file having an extension of ".ilvt" is referred to an "ilvt file" as appropriate.

An m2ts file having a name of "00001.m2ts" is a file used for 2D reproduction. By specifying this file, a Base view video stream is read out.

An m2ts file having a name of "00002.m2ts" is a file regarding a D2 view video stream. An m2ts file having a name of "00003.m2ts" is a file regarding a D1 view video stream.

An ilvt file having a name of "10000.ilvt" is a file used for B-D1 reproduction. By specifying this file, a Base view video stream and a D1 view video stream are read out.

An ilvt file having a name of "20000.ilvt" is a file used for B-D2 reproduction. By specifying this file, a Base view video stream and a D2 view video stream are read out.

In addition to the directories shown in FIG. 7, for example, a directory for storing an audio stream file is provided beneath the BDMV directory.

[Syntax of Each Data Item]

FIG. 8 illustrates the syntax of PlayList( ) written into a PlayList file.

"length" denotes a 32-bit unsigned integer representing the number of bytes from the byte immediately after the length field to the last byte of PlayList( ). That is, "length" represents the number of bytes from reserved_for_future_use to the last byte of PlayList.

Immediately after "length", 16-bit reserved_for_future_use is provided.

A 16-bit field "number_of_PlayItems" indicates the number of PlayItems included in the PlayList. In the example shown in FIG. 6, the number of PlayItems is three. A value starting from "0" is sequentially assigned to a PlayItem_id each time PlayItem( ) appears in the PlayList. For example, in FIG. 6, assignment is made so that PlayItem_ids=0, 1, and 2.

A 16-bit field "number of SubPaths" indicates the number of Sub Paths included in the PlayList. In the example shown in FIG. 6, the number of Sub Paths is three. A value starting from "0" is sequentially assigned to a Sub Path each time SubPath( ) appears in the PlayList. For example, in FIG. 6, assignment is made so that PlayItem_ids=0, 1, and 2. In the subsequent "for" statement, PlayItem( ) is referenced a number of times equal to the number of PlayItems, and SubPath( ) is referenced a number of times equal to the number of Sub Paths.

FIG. 9 illustrates the syntax of SubPath( ) shown in FIG. 8.

"length" denotes a 32-bit unsigned integer representing the number of bytes from the byte immediately after a length field to the last byte of Sub Path( ). That is, "length" represents the number of bytes from reserved_for_future_use to the last byte of PlayList.

Immediately after "length", 16-bit reserved_for_future_use is provided.

An 8-bit field "SubPath_type" indicates the type of application that performs processing using the Sub Path. For example, SubPath_type is used for indicating whether the Sub path represents "audio", "bitmap caption", or "text caption". The SubPath_type is described in more detail below with reference to FIG. 10.

Immediately after "SubPath_type", 15-bit reserved_for_future_use is provided.

A 1-bit field "is_repeat_SubPath" indicates a method for reproducing the Sub Path. That is, the field "is_repeat_SubPath" indicates whether, during reproduction of the Main Path, the Sub path is reproduced repeatedly or only once. For example, the field "is_repeat_SubPath" is used when the time at which a Clip referenced by the Main Path is reproduced differs from the time at which a Clip referenced by the Sub Path is reproduced (e.g., when the Main Path represents a path of a slide show of still images and the Sub Path represents an audio path BGM).

Immediately after "Is_repeat_SubPath", 8-bit reserved_for_future_use is provided.

An 8-bit field "number_of_SubPlayItems" indicates the number of SubPlayItems (the number of entries) included in the Sub Path. For example, in FIG. 6, number_of_SubPlayItems of SubPlayItem having SubPath_id=0 is one, and number_of_SubPlayItems of SubPlayItem having SubPath_id=1 is two. In the subsequent "for" statement, SubPlayItem( ) is referenced a number of times equal to the number of SubPlayItems.

FIG. 10 illustrates an example of SubPath_type.

In FIG. 10, "Out_of_mux" indicates that a stream referenced by a Sub Path (a stream referenced by a SubPlayItem that forms the Sub Path) and a stream referenced by a Main Path (a stream referenced by the PlayItem that forms the Main Path) are multiplexed into different TSs.

In contrast, "In_of_mux" indicates that a stream referenced by a Sub Path and a stream referenced by a Main Path are multiplexed into the same TS.

SubPath_type=0 and SubPath_type=1 are reserved.

SubPath_type=2 indicates "Audio presentation path of the Browsable slide show" (an audio presentation path of the browsable slide show).

SubPath_type=3 indicates "Interactive graphics presentation menu" (a presentation menu of interactive graphics).

SubPath_type=4 indicates "Text subtitle presentation path" (a presentation path of a text caption).

SubPath_type=5 indicates "2nd Audio Presentation path" (a path for referencing a 2nd audio stream). For example, the second audio stream referenced by the Sub Path having SubPath_type=5 serves as a comment (voice) of the director for the movie.

SubPath_type=6 indicates "2nd Video Presentation path" (a path for referencing a 2nd video stream). For example, the second video stream referenced by the Sub Path having SubPath_type=6 serves as a comment (a moving image) of the director for the movie.

SubPath_type=7 indicates a path of one or more ESs (Primary audio/PG/IG/Secondary audio) or a picture-in-picture presentation path.

SubPath_type=8 to SubPath_type=11 define SubPaths for an application that performs 3D reproduction. In this example, a different value is set in accordance with a multiplexing pattern of the Dependent view video streams referenced by the Subpath.

SubPath_type=8 indicates "Out-of-mux 3D SubPath from Disc", which indicates that the Dependent view video stream referenced by the Sub Path is recorded on the optical disk 2 and is multiplexed into a TS that is different from a TS into which the Base view video stream referenced by the Main Path is multiplexed.

SubPath_type=9 indicates "In-mux 3D SubPath from Disc", which indicates that the Dependent view video stream referenced by the Sub Path is recorded on the optical disk 2 and is multiplexed into a TS into which the Base view video stream referenced by the Main Path is multiplexed.

SubPath_type=10 indicates "Out-of-mux 3D SubPath from Local Storage", which indicates that the Dependent view video stream referenced by the Sub Path is recorded in the local storage and is multiplexed into a TS that is different from a TS into which the Base view video stream referenced by the Main Path is multiplexed.

As described in more detail below, the reproducing apparatus 1 can perform 3D reproduction by downloading a Dependent view video stream from a server and using the Dependent view video stream together with a Base view video stream recorded on the optical disk 2.

SubPath_type=11 indicates "In-mux 3D SubPath from Local Storage", which indicates that the Dependent view video stream referenced by the Sub Path is recorded on the local storage and is multiplexed into a TS into which the Base view video stream referenced by the Main Path is multiplexed. In such a case, the Base view video stream is also recorded in the local storage.

SubPath_type=12 to SubPath_type=255 are reserved.

In this manner, a Sub Path that references the Dependent view video stream includes information indicating the location at which the Dependent view video stream referenced by the Sub Path is recorded and a value representing a multiplexing pattern for a TS.

Accordingly, the reproducing apparatus 1 can identify whether the Dependent view video stream referenced by the Sub Path is recorded on the optical disk 2 or in the local storage.

In addition, the reproducing apparatus 1 can identify whether the Dependent view video stream referenced by the Sub Path is multiplexed into the TS of the Base view video stream or a TS different from the TS of the Base view video stream.

The reproducing apparatus 1 can change a method for reading the Base view video stream in accordance with the result of identification.

FIG. 11 illustrates the syntax of SubPlayItem(i) shown in FIG. 9.

"length" denotes a 16-bit unsigned integer representing the number of bytes from the byte immediately after a length field to the last byte of Sub playItem( ).

In FIG. 11, the following two cases are separately written: the case in which a SubPlayItem references one Clip and the case in which a SubPlayItem references a plurality of Clips.

The case in which a SubPlayItem references one Clip is described next.

Clip_Information_file_name[0] indicates a Clip to be referenced.

Clip_codec_identifier[0] indicates the codec method for the Clip. Immediately after Clip_codec_identifier[0], reserved_for_future_use is provided.

"is_multi_Clip_entries" is a flag indicating the presence/absence of registration of a multi-clip. If the flag "is_multi_Clip_entries" is on, the syntax for the case in which the SubPlayItem references a plurality of Clips is referenced.

ref_to_STC_id[0] represents information regarding an STC discontinuity point (a discontinuity point based on a system time).

SubPlayItem_IN_time indicates a start point of a reproduction interval of the Sub Path. SubPlayItem_OUT_time indicates an end point of the reproduction interval of the Sub Path.

sync_PlayItem_id and sync_start_PTS_of_PlayItem indicate a start time at which the Sub Path starts reproduction on the time axis of the Main Path.

SubPlayItem_IN_time, SubPlayItem_OUT_time, sync_PlayItem_id, and sync_start_PTS_of_PlayItem are used by the Clip referenced by the SubPlayItem in a shared manner.

The case in which "if (is_multi_Clip_entries==1b" is true and a SubPlayItem references a plurality of Clips is described next.

num_of_Clip_entries indicates the number of referenced Clips. The number of Clip_Information_file_name[SubClip_entry_id]s represents the number of Clips excluding Clip_Information_file_name[0].

Clip_codec_identifier[SubClip_entry_id] indicates the codec method.

ref_to_STC_id[SubClip_entry_id] represents information regarding an STC discontinuity point (a discontinuity point on the basis of the system time). Immediately after ref_to_STC_id[SubClip_entry_id], reserved_for_future_use is provided.

FIG. 12 illustrates the syntax of PlayItem( ) shown in FIG. 8.

"length" denotes a 16-bit unsigned integer representing the number of bytes from the byte immediately after the length field to the last byte of PlayItem( ).

Clip_Information_file_name[0] indicates the name of a Clip Information file of a Clip referenced by the PlayItem. Note that the file name of the mt2s file including the Clip and the file name of the Clip Information file corresponding to the mt2s file include the same 5-digit number.

Clip_codec_identifier[0] indicates the codec method used for the Clip. Immediately after the Clip_codec_identifier[0], reserved_for_future_use is provided. Immediately after the reserved_for_future_use, is_multi_angle and connection_condition are provided.

ref_to_STC_id[0] represents information regarding an STC discontinuity point (a discontinuity point on the basis of the system time).

IN_time indicates the start point of the reproduction interval of the PlayItem, and OUT_time indicates the end point of the reproduction interval of the PlayItem.

Immediately after OUT_tim, UO_mask_table( ), PlayItem_random_access_mode, and still_mode are provided.

STN_table( ) includes information regarding an AV stream referenced by the target PlayItem. In addition, if a Sub Path reproduced in association with the target PlayItem is present, the STN_table( ) further includes information regarding an AV stream referenced by SubPlayItem that forms the Sub Path.

FIG. 13 illustrates the syntax of the STN_table( ) shown in FIG. 12.

STN_table( ) represents the attributes of the PlayItem.

"length" denotes a 16-bit unsigned integer representing the number of bytes from the byte immediately after the length field to the last byte of STN_table( ). Immediately after the length field, a 16-bit reserved_for_future_use is provided.

number_of_video_stream_entries indicates the number of streams that are included (registered) in the STN_table( ) and that have video_stream_ids assigned thereto.

video_stream_id represents information for identifying each of the video streams. For example, the ID of the Base view video stream can be identified by using the video_stream_id. The ID of the Dependent view video stream may be defined in the STN_table( ) or may be obtained through computation as described below.

video_stream_number indicates the video stream number that is used for video switching and that is visible to the user.

number_of_audio_stream_entries indicates the number of streams of a first audio stream included in the STN_table( ) as entries. audio_stream_id is assigned to each of the streams. The audio_stream_id represents information for identifying each of the audio streams. audio_stream_number indicates the audio stream number that is used for audio switching and that is visible to the user.

number_of_audio_stream2_entries indicates the number of streams in a second audio stream to which audio_stream_id2 is assigned included in the STN_table( ). The audio_stream_id2 represents information for identifying each of the audio streams. audio_stream_number indicates the audio stream number that is used for audio switching and that is visible to the user. In this example, the reproduced sound can be switched.

number_of_PG_txtST_stream_entries indicates the number of streams to which PG_txtST_stream_id is assigned included in the STN_table( ). In STN_table( ), a PG stream obtained by runlength-encoding a bitmap caption, such as a sub-picture of a DVD, and a text caption file (textST) are registered. PG_txtST_stream_number indicates a caption stream number that is used for caption switching and that is visible to the user.

number_of_IG_stream_entries indicates the number of streams to which IG_stream_id is assigned included in the STN_table( ). In STN_table( ), an IG stream is registered. IG_stream_number indicates a graphics stream number that is used for graphics switching and that is visible to the user.

The IDs of the Main TS and Sub TS, which are described below, are also registered in STN_table( ). These IDs are not the IDs of the elementary streams, but the IDs of the TSs. This information is written into stream_attribute( ).

FIG. 14 illustrates an example of application_type.

The application_type is written into the Clip Information file (ClipInfo( )). The Clip Information file is provided for each of the Clips.

"application_type=0" is reserved.

"application_type=1" indicates that the TS (the Clip) corresponding to the Clip Information file including the statement is a TS for a Movie application.

"application_type=2" indicates that the TS corresponding to the Clip Information file including the statement is a TS for a Time-based Slideshow.

"application_type=3" indicates that the TS corresponding to the Clip Information file including the statement is a TS for a Browsable Slideshow.

"application_type=4" indicates that the TS corresponding to the Clip Information file including the statement is a TS for a Browsable Slideshow for the Sub Path.

"application_type=5" indicates that the TS corresponding to the Clip Information file including the statement is a TS for interactive graphics for the Sub Path.

"application_type=6" indicates that the TS corresponding to the Clip Information file including the statement is a TS for a text sub-title (text caption data) for the Sub Path.

"application_type=7" indicates that the TS corresponding to the Clip Information file including the statement is a TS for the Sub Path including one or more ESs.

"application_type=8" indicates that the TS corresponding to the Clip Information file including the statement is a TS for a 3D playback application.

"application_type=9" to "application_type=255" are reserved.

As described above, the values of the application_type include a value defined for an application that performs 3D reproduction. Accordingly, an application that performs 3D reproduction can identify a TS that can be processed by the application using the value of the application_type.

[Example of Setting of Application_type and SubPath_type]

Figure 15:
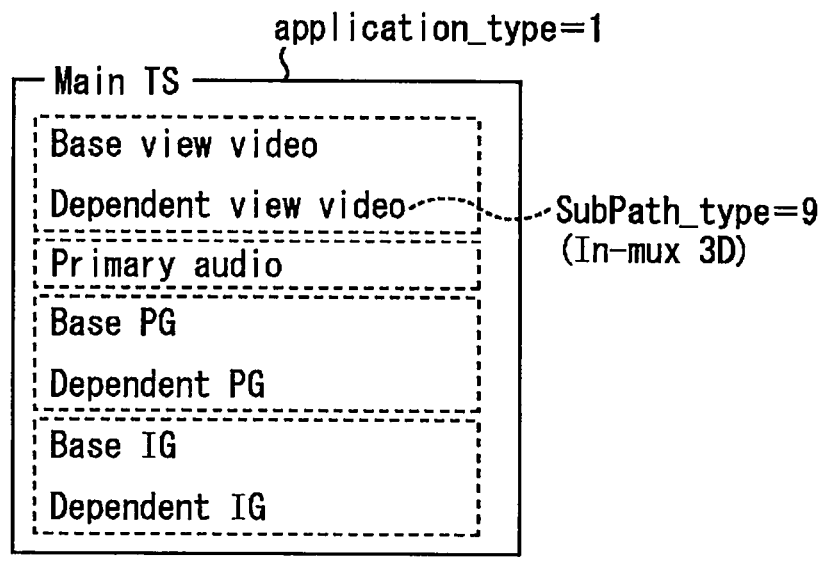
FIG. 15 illustrates an example of setting of the application_type and SubPath_type.

FIG. 15 illustrates an example of setting of the Application_type and SubPath_type.

In the Main TS shown in FIG. 15, the streams of Base view video, Dependent view video, Primary audio, Base PG, Dependent PG, Base IG, and Dependent IG are multiplexed. As in this example, the Dependent view video stream and the Base view video stream may be included in the Main TS.

The optical disk 2 includes the Main TS and a Sub TS. The main TS includes at least the Base view video stream. The Sub TS includes streams other than the Base view video stream and is used together with the Main TS.

Like video, in order to allow 3D display, the Base and Dependent streams are provided for each of the PG and IG.

The plane of the Base view of each of the PG and IG obtained by decoding the streams is appropriately combined with the plane of the Base view video obtained by decoding the Base view video stream and is displayed. Similarly, the plane of the Dependent view of each of the PG and IG is appropriately combined with the plane of the Dependent view video obtained by decoding the Dependent view video stream and is displayed.

For example, when the Base view video stream is the stream of an L image and the Dependent view video stream is the stream of an R image, the stream of the Base view is a stream of the graphics of the L image for each of the PG and IG. In addition, the PG stream and IG stream of the Dependent view are streams of the graphics of the R image.

In contrast, when the Base view video stream is the stream of an R image and the Dependent view video stream is the stream of an L image, the stream of the Base view is a stream of the graphics of the R image for each of the PG and IG. In addition, the PG stream and IG stream of the Dependent view are streams of the graphics of the L image.

The application_type of the Main TS (the application_type written to the Clip Information file corresponding to the Main TS) is 1.

The Base view video stream included in the Main TS is a stream handled by not only an application for performing 3D reproduction but also an ordinary Movie application for performing 2D reproduction, as noted above. The value of the application_type is set to 1 for a TS handled by a Movie application and 3D playback application.

In addition, since the Dependent view video stream is included in the TS of the Base view video stream, the value of SubPath_type of the Sub Path that references the Dependent view video stream is 9. In this example, the Dependent view video stream is recorded on the optical disk 2.

Figure 16:
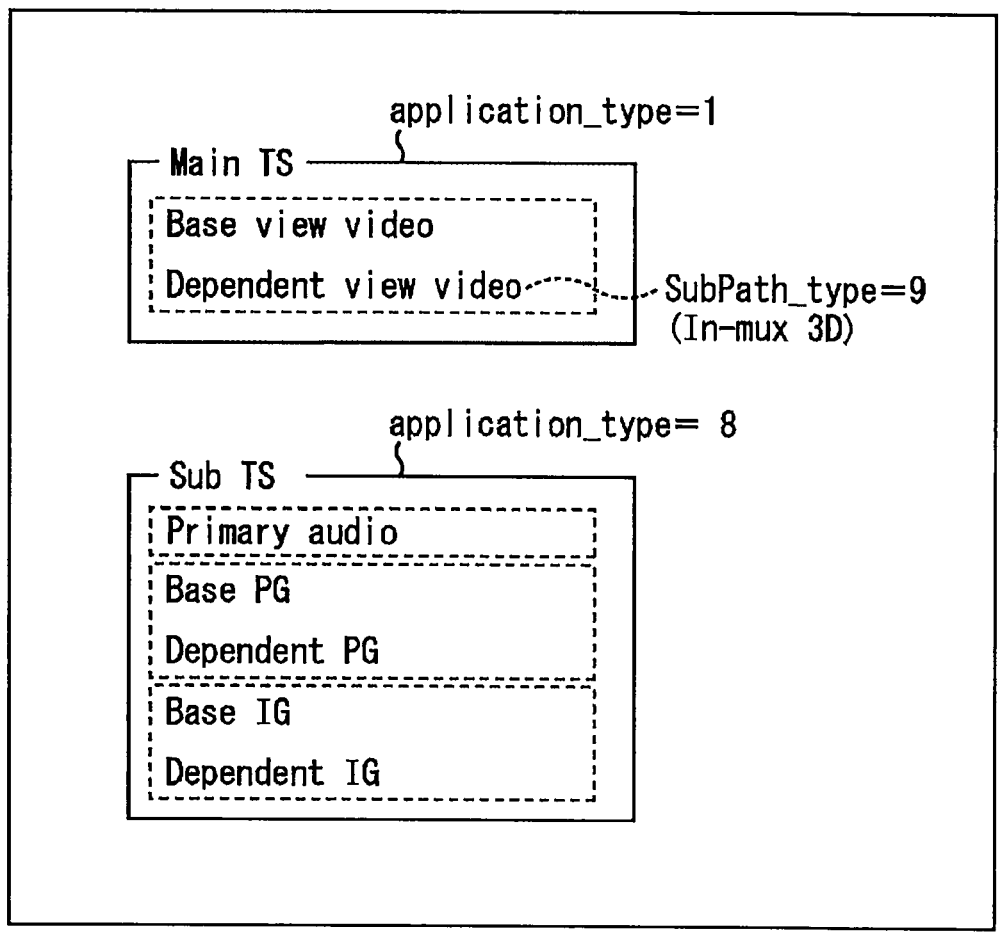
FIG. 16 illustrates another example of setting of the application_type and the SubPath_type.

FIG. 16 illustrates another example of setting of the Application_type and SubPath_type.

In the Main TS shown in FIG. 16, the streams of Base view video and Dependent view video are multiplexed.

The value of application_type of the Main TS is set to 1.

In addition, since the Dependent view video stream is included in the TS of the Base view video stream, the value of SubPath_type of the Sub Path that references the Dependent view video stream is 9. As in the above-described example, in this example, the Dependent view video stream is recorded on the optical disk 2.

In the Sub TS shown in FIG. 16, the streams of Primary audio, Base PG, Dependent PG, Base IG, and Dependent IG are multiplexed.

Since the TS is handled by a 3D playback application, the value of the application_type of the Sub TS is 8.

Figure 17:
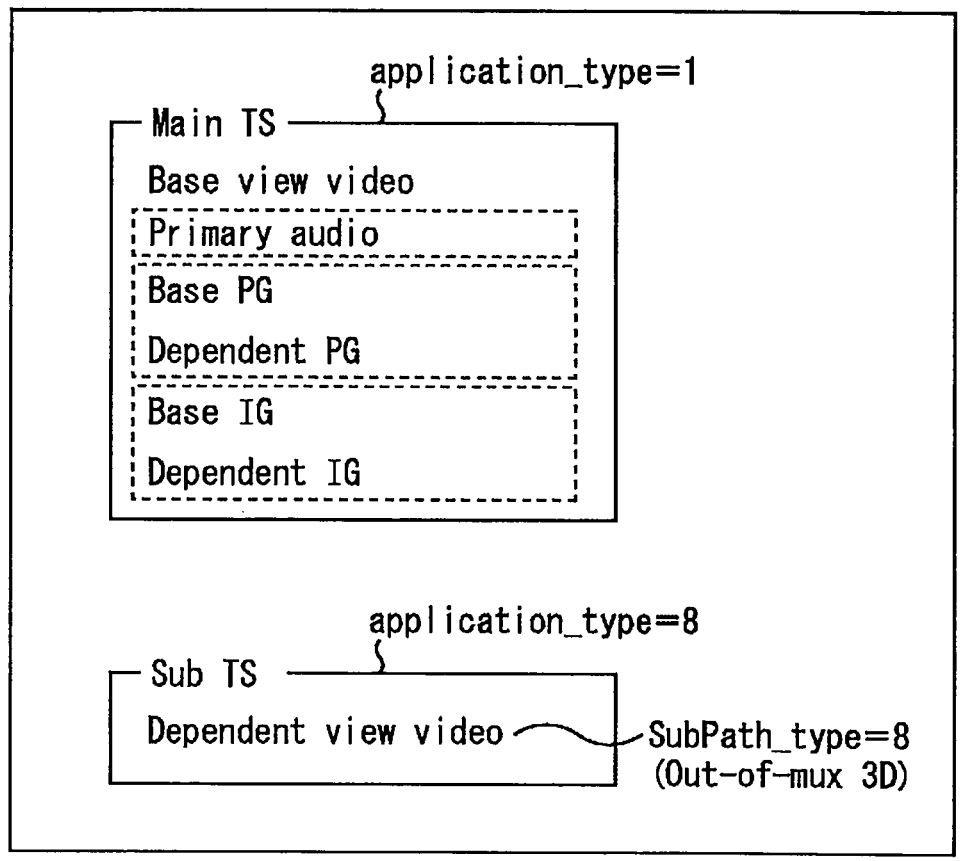
FIG. 17 illustrates still another example of setting of the application_type and the SubPath_type.

FIG. 17 illustrates still another example of setting of the Application_type and SubPath_type.

In the Main TS shown in FIG. 17, the streams of Base view video, Primary audio, Base PG, Dependent PG, Base IG, and Dependent IG are multiplexed.

The value of the application_type of the Main TS is 1.

The Sub TS shown in FIG. 17 includes the Dependent view video stream.

Since the Dependent view video stream is included in a TS different from a TS of the Base view video stream, the value of SubPath_type of the Sub Path that references the Dependent view video stream is 8. As in the above-described example, in this example, the Dependent view video stream is recorded on the optical disk 2.

In this way, the value indicative of a TS that is handled by a 3D playback application is set as the value of the application_type in the Clip Information file corresponding to the Sub TS handled by the 3D playback application.

In addition, in the Sub Path that references the Dependent view video stream, the value determined in accordance with the location at which the Dependent view video stream is recorded and the multiplexing pattern is set as the value of the SubPath_type.

Note that in the BD standard, the number of TSs that can be concurrently read out of the optical disk 2 is limited to two.

In addition, in a Browsable Slideshow, as described above, an audio stream used as BGM is referenced by the Sub Path (SubPath_type=2) separately from the video stream referenced by the Main Path. When a slide show is played back, the video stream referenced by the Main Path and the audio stream referenced by the Sub Path are read out at the same time.

3D representation of a slide show of still images is discussed below. If the Base view video stream and the Dependent view video stream of the video stream are included in different TSs, the two TSs can be read out. However, the audio stream used as BGM cannot be read out.

Accordingly, during operation of a Browsable slideshow (Application_type=3), only the setting "SubPath_type=9" or "SubPath_type=11" is allowed. Thus, a value of 8 or 10, which indicates that the Dependent view video stream is included in a TS different from a TS of the Base view video stream, is not used as the value of SubPath_type of the Sub Path that references the Dependent view video stream included in the TS handled by a Browsable slideshow application.

In this way, by controlling the value of the SubPath_type in the possible range in accordance with the Application_type, a problem of the occurrence of an unreadable TS can be prevented.

[Definition of stream_id]

As illustrated in FIG. 13, in a STN_table, the IDs of streams (stream_ids) referenced by the PlayItem and SubPlayItem are managed.

The video_stream_id managed in the STN_table represents the ID of the Base view video stream, and the PG_txtST_stream_id represents the ID of the Base PG stream. In addition, the IG_stream_id represents the ID of the Base IG stream.

Here, for the Dependent view video stream, the stream_ids are not registered in the STN_table. The stream_ids can be computed using the stream_id of the Base view video stream.

For example, the stream_id of the Dependent view video stream can be defined using the following equation (1):

$$\text{video\_stream\_id} + x = \text{dependent\_view\_video\_stream\_id} \quad (1)$$

The stream_id of the Dependent PG stream can be defined using the following equation (2):

$$\text{PG\_textST\_stream\_id} + x = \text{Dependent\_PG\_textST\_stream\_id} \quad (2)$$

The stream_id of the Dependent IG stream can be defined using the following equation (3):

$$\text{IG\_stream\_id} + x = \text{Dependent\_IG\_stream\_id} \quad (3)$$

Any value can be used for x in equations (1) to (3). Different values may be substituted into x in equations (1) to (3).

The value of x may be identified from the STN_table. Alternatively, the value of x may be preset in the reproducing apparatus 1.

In this way, a recording apparatus for recording data on the optical disk 2 need not set the stream_id of the Dependent view video stream in the STN_table separately from the stream_id of the Base view video stream.

In addition, if the reproducing apparatus 1 identifies the stream_id of the Base view video stream using the STN_table, the reproducing apparatus 1 can identify the stream_id of the Dependent view video stream corresponding to the Base view video stream through computation.

In the BD standard, a variety of processes using a stream can be realized by JAVA (registered trade name) applications.

Figure 18:
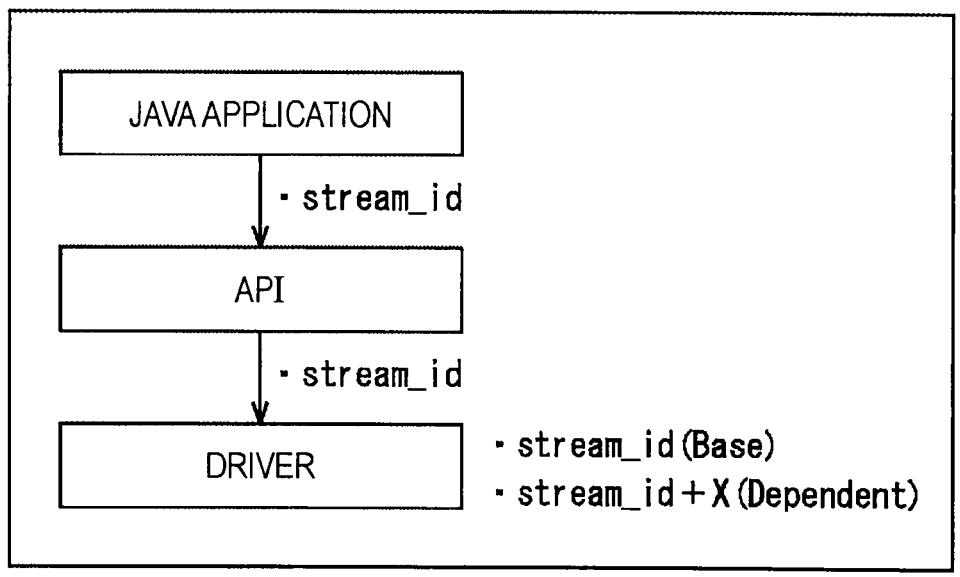
FIG. 18 illustrates an example of specifying a stream_id using a Java (registered trade name) application.

For example, when a process is performed using a certain stream, a JAVA (registered trade name) application instructs a driver to read out the stream via an API (Application Programming Interface) while specifying the stream_id, as shown in FIG. 18.

The driver considers the stream_id specified by the JAVA (registered trade name) application via the API as the stream_id of the Base view video stream. Thereafter, the driver identifies the stream_id of the Dependent view video stream through computation using the specified stream_ID. In addition, the driver reads out the Base view video stream and the Dependent view video stream on the basis of the identified stream_id.

In this way, even when a 3D display operation is performed, the number of stream_IDs specified by the Java (registered trade name) application via the API can be one. Furthermore, the API need not be extended such that two stream_IDs for the Base view and Dependent view are specified.

In addition, if the ID of the Dependent view stream is automatically computed using the ID of the Base view stream, the following advantages can be provided.

In BDs, the algorithm for automatically selecting a stream to be reproduced by a player is provided. For example, according to the algorithm, when an English video program is displayed, a caption to be reproduced at the same time can be automatically selected.

If a stream ID is assigned to even the Dependent view video stream, the process using the stream playback selection algorithm performed by existing players need to be performed for the Dependent view. Accordingly, the processing load imposed on the players is increased. That is, after performing the process based on the stream playback selection algorithm on the Base view stream, the players need to perform the process based on the stream playback selection algorithm on the Dependent view video stream.

As described above, by allowing the ID of the Dependent view video stream to be automatically computed using the ID of the Base view stream, the need for the process performed on the Dependent view stream can be eliminated.

[Example of Statements in PlayList File]

FIG. 19 illustrates the syntax of the PlayList file.

The PlayList file is stored in the PLAYLIST directory shown in FIG. 7 and has an extension of ".mpls".

The statements illustrated in FIG. 8 are included in the PlayList file.

In FIG. 19, type_indicator indicates the type of a file "xxxxx.mpls".

version_number indicates the version number of a file "xxxxx.mpls". The version number is a 4-digit number. For example, a Playlist file for 3D reproduction has a version number of "0240" which indicates "3D Spec version".

PlayList_start_address indicates the top address of the PlayList( ) which is a byte address relative to the top byte of the PlayList file.

PlayListMark_start_address indicates the top address of the PlayListMark( ) which is a byte address relative to the top byte of the PlayList file.

ExtensionData_start_address indicates the top address of the ExtensionData( ) which is a byte address relative to the top byte of the PlayList file.

Immediately after the ExtensionData_start_address, 160-bit reserved_for_future_use is included.

AppInfoPlayList( ) stores parameters regarding playback control of the PlayList, such as playback restriction.

PlayList( ) stores parameters regarding the Main Path and Sub Path illustrated in FIG. 8.

PlayListMark( ) stores mark information on the PlayList, that is, information regarding a mark indicating a jump destination (a jump point) of a user operation or a command that instructs chapter jump.

ExtensionData( ) allows private data to be inserted therein.

FIG. 20 illustrates examples of statements in the PlayList.

As shown in FIG. 20, a 2-bit 3D_PL_type and a 1-bit view_type are written into the PlayList file. For example, the view_types are written to the AppInfoPlayList( ) shown in FIG. 19.

The 3D_PL_type indicates the type of PlayList.

The view_type indicates whether the Base view video stream for which playback is managed by the PlayList is a stream of an L image (L view) or an R image (R view).

Alternatively, the view_type indicates whether the Dependent view video stream is a stream of an L image or an R image.

FIG. 21 illustrates the meaning of the values of the 3D_PL_type.

The value "00" of the 3D_PL_type indicates the PlayList for 2D reproduction.

The value "01" of the 3D_PL_type indicates the PlayList for 3D B-D1 reproduction.

The value "10" of the 3D_PL_type indicates the PlayList for 3D B-D2 reproduction.

For example, when the value of the 3D_PL_type is 01 or 10, the 3DPlayList information is registered in ExtenstionData( ) of the PlayList file. Examples of the registered 3DPlayList information include the file name of a clpi file corresponding to the Clip of the Dependent view video stream (e.g., "00002.clpi" in the example shown in FIG. 7).

FIG. 22 illustrates the meaning of the values of the view_type.

When 3D reproduction is performed, the value "0" of the view_type indicates that the Base view video stream is a stream of L view. In contrast, when 2D reproduction is performed, the value "0" of the view_type indicates that the Base view video stream is an AVC video stream.

The value "1" of the view_type indicates that the Base view video stream is a stream of R view.

Since the view_type is included in the PlayList file, the reproducing apparatus 1 can identify whether the Base view video stream is a stream of L view or a stream of R view.

For example, when the reproducing apparatus 1 outputs a video signal to the display apparatus 3 via an HDMI cable, the reproducing apparatus 1 is required to identify whether the video signal is an R view signal or an L view signal and output the video signal.

Since the reproducing apparatus 1 is allowed to identify whether the Base view video stream is a stream of L view or a stream of R view, the reproducing apparatus 1 can identify whether the video signal is an R view signal or an L view signal and output the video signal.

[Example Configuration of Reproducing Apparatus 1]

Figure 23:
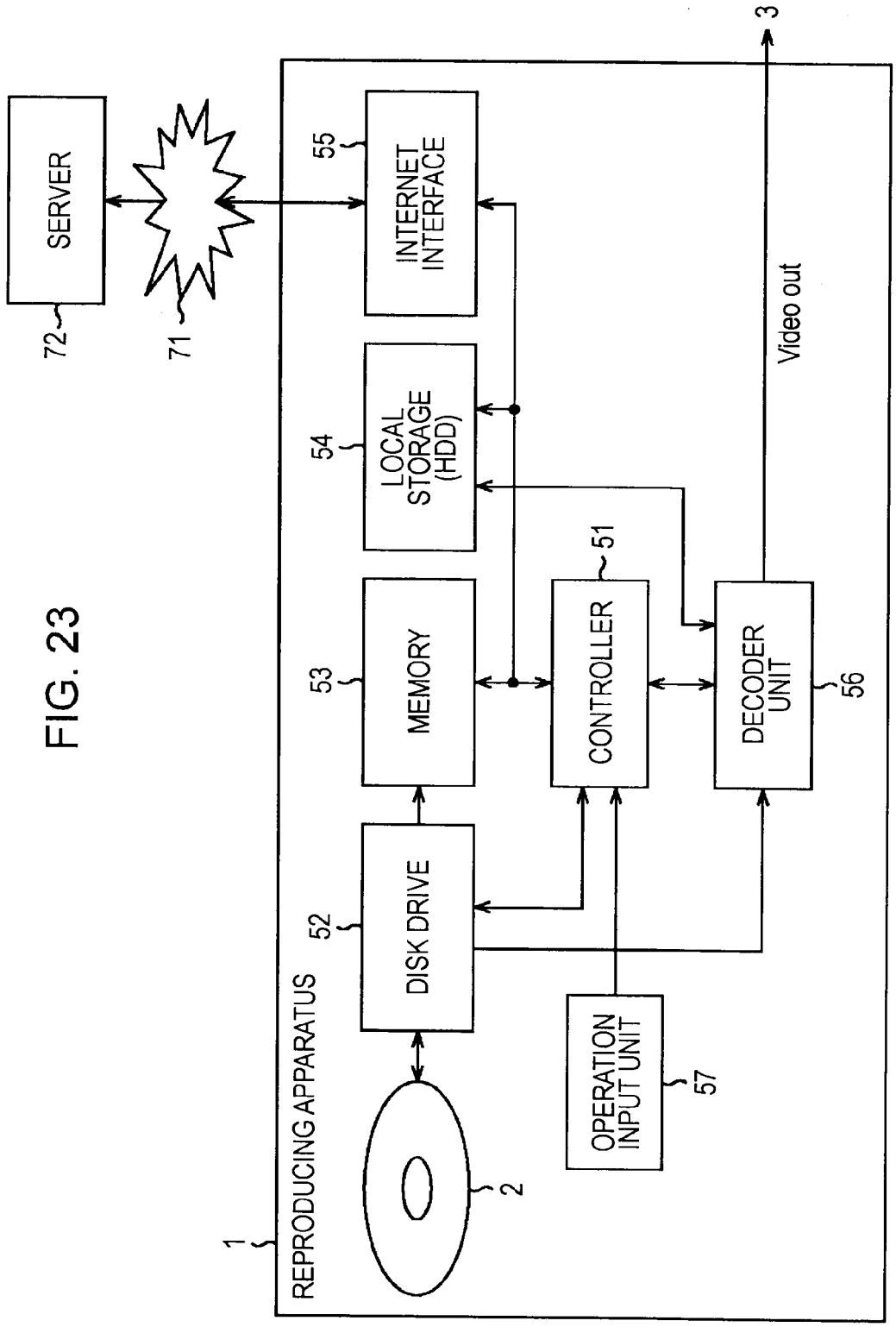
FIG. 23 is a block diagram of an example configuration of a reproducing apparatus.

FIG. 23 is a block diagram of an example configuration of the reproducing apparatus 1.

A controller 51 executes a prepared control program and controls the overall operation of the reproducing apparatus 1.

For example, the controller 51 controls a disk drive 52 so as to read out a PlayList file for 3D reproduction. In addition, the controller 51 instructs the disk drive 52 to read out a Main TS and a Sub TS on the basis of the ID registered in the STN_table and supply the Main TS and Sub TS to a decoder unit 56.

The disk drive 52 reads data out of the optical disk 2 under the control of the controller 51 and outputs the readout data to one of the controller 51, a memory 53, and the decoder unit 56.

The memory 53 stores data necessary for the controller 51 to perform a variety of processes as needed.

A local storage 54 is formed from, for example, an HDD (Hard Disk Drive). The local storage 54 stores, for example, a Dependent view video stream downloaded from a server 72. A stream stored in the local storage 54 is supplied to the decoder unit 56 as needed.

Under the control of the controller 51, an Internet interface 55 communicates with the server 72 via a network 71 and downloads data from the server 72. Thereafter, the Internet interface 55 supplies the downloaded data to the local storage 54.

Data used for updating the data stored on the optical disk 2 is downloaded from the server 72. In this way, a downloaded Dependent view video stream can be used together with the Base view video stream recorded on the optical disk 2. Thus, 3D reproduction that differs from that recorded on the optical disk 2 can be provided. When the Dependent view video stream is downloaded, the information included in the PlayList is updated as needed.

The decoder unit 56 decodes the stream supplied from the disk drive 52 or the local storage 54 and acquires a video signal. Thereafter, the decoder unit 56 outputs the acquired video signal to the display apparatus 3. In addition, an audio signal is supplied to the display apparatus 3 via a predetermined route.

An operation input unit 57 includes input devices, such as buttons, keys, a touch-sensitive panel, a jog dial, and a mouse, and a receiver unit that receives, for example, an infrared signal transmitted from a predetermined remote commander. The operation input unit 57 detects an operation performed by a user and supplies a signal corresponding to the detected user operation to the controller 51.

Figure 24:
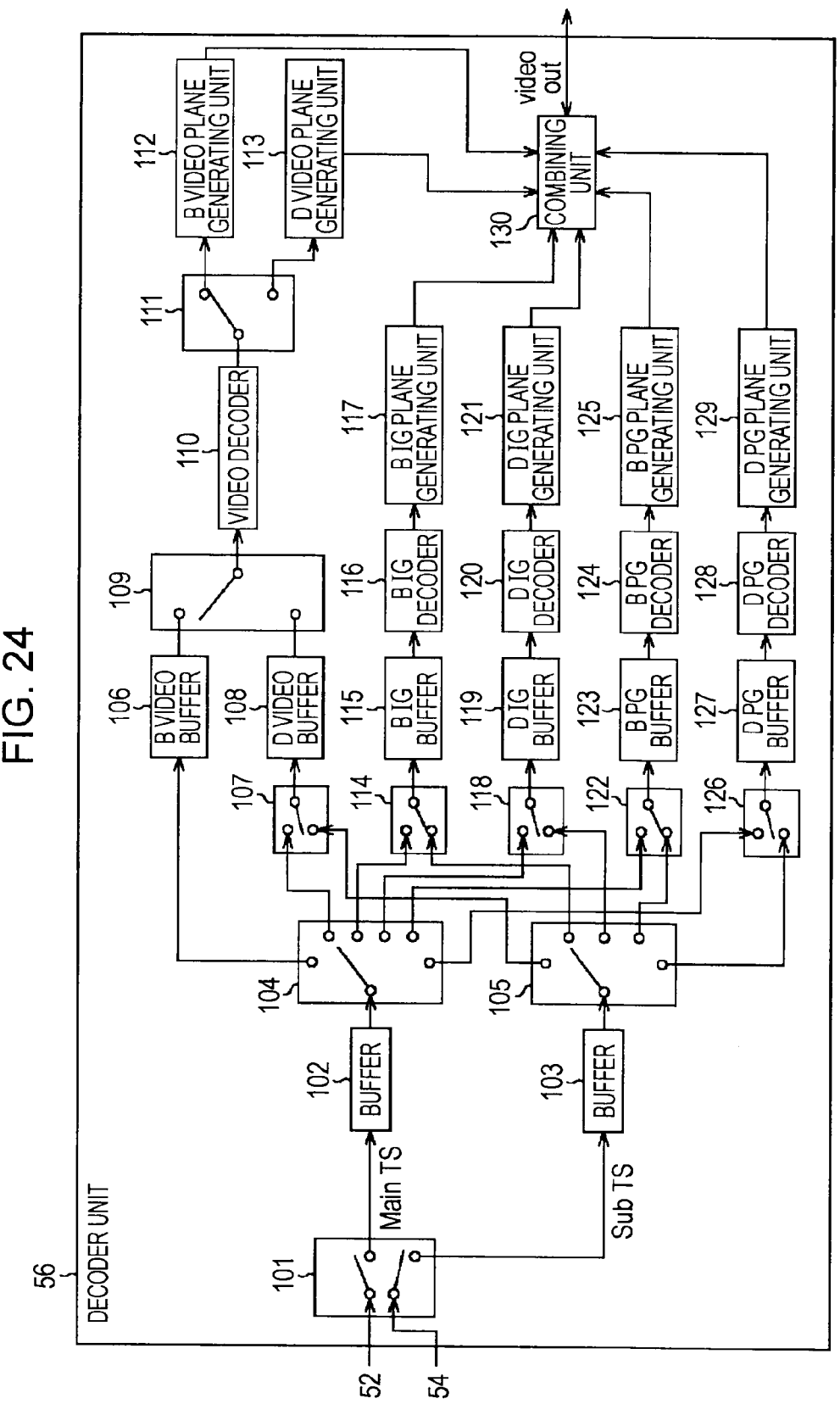
FIG. 24 illustrates an example configuration of a decoder unit shown in FIG. 23.

FIG. 24 illustrates an example configuration of the decoder unit 56.

The configuration for processing a video signal is shown in FIG. 24. In the decoder unit 56, a process for decoding an audio signal is also performed. The result of decoding the audio signal is output to the display apparatus 3 via a certain route (not shown).

A PID filter 101 determines whether a TS supplied from the disk drive 52 or the local storage 54 is a Main TS or a Sub TS using the PID of a packet of the TS or the ID of the stream. The PID filter 101 outputs the Main TS to a buffer 102 and outputs the Sub TS to a buffer 103.

A PID filter 104 sequentially reads a packet of the Main TS stored in the buffer 102 and dispatches the packet in accordance with the PID.

For example, the PID filter 104 outputs a packet of the Base view video stream included in the Main TS to a B video buffer 106 and outputs a packet of the Dependent view video stream to a switch 107.

In addition, the PID filter 104 outputs a packet of the Base IG stream included in the Main TS to a switch 114 and outputs a packet of the Dependent IG stream to a switch 118.

The PID filter 104 outputs a packet of the Base PG stream included in the Main TS to a switch 122 and outputs a packet of the Dependent PG stream to a switch 126.

As illustrated in FIG. 15, the streams of Base view video, Dependent view video, Base PG, Dependent PG, Base IG, and Dependent IG may be multiplexed in the Main TS.

A PID filter 105 sequentially reads a packet of the Sub TS stored in the buffer 103 and dispatches the packet in accordance with the PID.

For example, the PID filter 105 outputs a packet of the Dependent view video stream included in the Sub TS to the switch 107.

In addition, the PID filter 105 outputs a packet of the Base IG stream included in the Sub TS to the switch 114 and outputs a packet of the Dependent IG stream to the switch 118.

The PID filter 105 outputs a packet of the Base PG stream included in the Sub TS to the switch 122 and outputs a packet of the Dependent PG stream to the switch 126.

As illustrated in FIG. 17, the Dependent view video stream may be included in the Sub TS. In addition, as illustrated in FIG. 16, the streams of Base PG, Dependent PG, Base IG, and Dependent IG may be multiplexed in the Sub TS.

The switch 107 outputs a packet of the Dependent view video stream supplied from the PID filter 104 or the PID filter 105 to a D video buffer 108.

A switch 109 sequentially reads the packet of the Base view video stream stored in the B video buffer 106 and the packet of the Dependent view video stream stored in the D video buffer 108 in accordance with clock time information that determines a time of decoding. For example, a packet including certain picture data of the Base view video and a packet including picture data of the Dependent view video stream corresponding to the certain picture data have the same clock time information.

The switch 109 outputs the packet read out of the B video buffer 106 or the D video buffer 108 to a video decoder 110.

The video decoder 110 decodes the packet supplied from the switch 109 so as to acquire data of the Base view video or the Dependent view video. Thereafter, the video decoder 110 outputs the acquire data to a switch 111.

The switch 111 outputs the data acquired by decoding the packet of the Base view video to a B video plane generating unit 112 and outputs the data acquired by decoding the packet of the Dependent view video to a D video plane generating unit 113.

The B video plane generating unit 112 generates a plane of the Base view video using the data supplied from the switch 111 and outputs the generated plane to a combining unit 130.

The D video plane generating unit 113 generates a plane of the Dependent view video using the data supplied from the switch 111 and outputs the generated plane to the combining unit 130.

The switch 114 outputs a packet of the Base IG stream supplied from the PID filter 104 or the PID filter 105 to a B IG buffer 115.

A B IG decoder 116 decodes the packet of the Base IG stream stored in the B IG buffer 115 and outputs the decoded data to a B IG plane generating unit 117.

The B IG plane generating unit 117 generates a plane of the Base IG using the data supplied from the B IG decoder 116 and outputs the generated plane to the combining unit 130.

The switch 118 outputs the packet of the Dependent IG stream supplied from the PID filter 104 or the PID filter 105 to a D IG buffer 119.

A D IG decoder 120 decodes the packet of the Dependent IG stream stored in the D IG buffer 119 and outputs the decoded data to a D IG plane generating unit 121.

The D IG plane generating unit 121 generates a plane of the Dependent IG using the data supplied from the D IG decoder 120 and outputs the generated plane to the combining unit 130.

The switch 122 outputs the packet of the Base PG stream supplied from the PID filter 104 or the PID filter 105 to a B PG buffer 123.

A B PG decoder 124 decodes the packet of the Base PG stream stored in the B PG buffer 123 and outputs the decoded data to a B PG plane generating unit 125.

The B PG plane generating unit 125 generates a plane of the Base PG using the data supplied from the B PG decoder 124 and outputs the generated plane to the combining unit 130.

The switch 126 outputs the packet of the Dependent PG stream supplied from the PID filter 104 or the PID filter 105 to a D PG buffer 127.

A D PG decoder 128 decodes the packet of the Dependent PG stream stored in the D PG buffer 127 and outputs the decoded data to a D PG plane generating unit 129.

The D PG plane generating unit 129 generates a plane of the Dependent PG using the data supplied from the D PG decoder 128 and outputs the generated plane to the combining unit 130.

The combining unit 130 combines the plane of the Base view video supplied from the B video plane generating unit 112, the plane of the Base IG supplied from the B IG plane generating unit 117, and the plane of the Base PG supplied from the B PG plane generating unit 125 by overlapping the planes in a predetermined order. Thus, the combining unit 130 generates a plane of the Base view.

In addition, the combining unit 130 combines the plane of the Dependent view video supplied from the D video plane generating unit 113, the plane of the Dependent IG supplied from the D IG plane generating unit 121, and the plane of the Dependent PG supplied from the D PG plane generating unit 129 by overlapping the planes in a predetermined order. Thus, the combining unit 130 generates a plane of the Dependent view.

The combining unit 130 outputs the data of the plane of Base view and the data of the plane of Dependent View. The video data output from the combining unit 130 is supplied from the display apparatus 3. By alternately displaying the plane of Base view and the plane of Dependent view, the display apparatus 3 performs 3D display.

Figure 25:
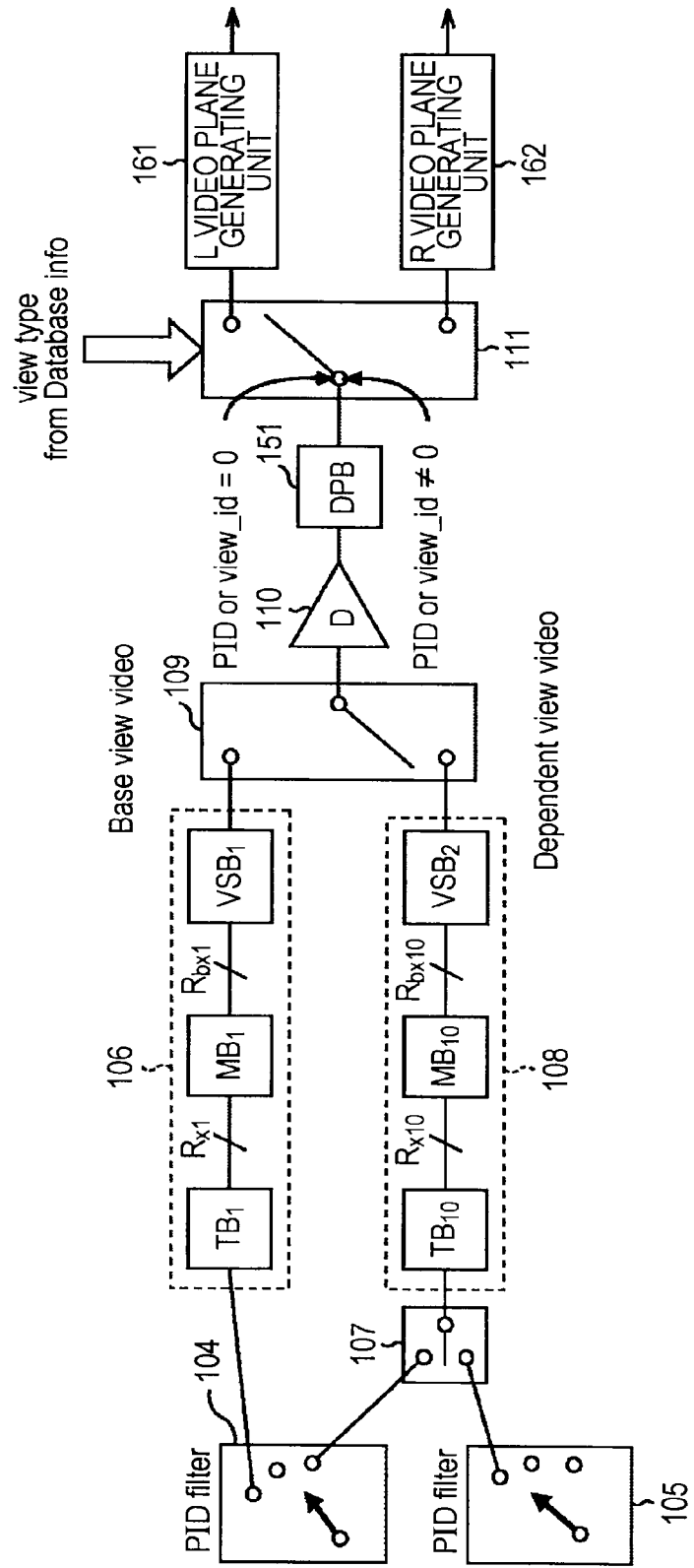
FIG. 25 illustrates the structure for processing a video stream.

FIG. 25 illustrates the structure for processing a video stream.

In FIG. 25, the same reference numerals are used for identical or similar components as used for the configuration shown in FIG. 24. Although not shown in FIG. 24, a DPB (Decoded Picture Buffer) 151 for storing decoded picture data is disposed downstream of the video decoder 110. Descriptions of the same components are not repeated as appropriate.

In addition, in the example shown in FIG. 25, an L video plane generating unit 161 is disposed in place of the B video plane generating unit 112 shown in FIG. 24. An R video plane generating unit 162 is disposed in place of the D video plane generating unit 113 shown in FIG. 24.

The L video plane generating unit 161 generates a plane of L view video. In addition, the R video plane generating unit 162 generates a plane of R view video.

In this example, the switch 111 needs to differentiate video data of L view from video data of R view and output the video data.

That is, the switch 111 identifies which one of the data obtained by decoding the packet of the Base view video and the data obtained by decoding the packet of the Dependent view video is video data of L view or R view.

To identify between the L view and the R view, the view_type illustrated in FIGS. 20 and 22 is used. For example, the controller 51 outputs the view_type written in the PlayList file to the switch 111.

When the value of the view_type is "0", the switch 111 decodes a packet of the Base view video identified by PID=0 among data stored in the DPB 151 and outputs the obtained data to the L video plane generating unit 161. As noted above, the value "0" of view_type indicates that the Base view video stream is a stream of L view. For example, PID of 0 is assigned to a packet of the Base view video, and PID of a value other than 0 is assigned to a packet of the Dependent view video.

In such a case, the switch 111 decodes a packet of the Dependent view video having a PID of a value other than 0 and outputs the decoded data to the R video plane generating unit 162.

In contrast, when the value of the view_type is "1", the switch 111 decodes a packet of the Base view video identified by PID=0 among data stored in the DPB 151 and outputs the obtained data to the R video plane generating unit 162. The value "1" of view_type indicates that the Base view video stream is a stream of R view.

In such a case, the switch 111 decodes a packet of the Dependent view video having a PID of a value other than 0 and outputs the decoded data to the L video plane generating unit 161.

The L video plane generating unit 161 generates a plane of L view video using the data supplied from the switch 111 and outputs the generated plane to the combining unit 130. The plane of L view video output from the L video plane generating unit 161 is appropriately combined with other L view data by the combining unit 130. The combined plane is output to the display apparatus 3 as the data of an L image.

The R video plane generating unit 162 generates a plane of R view video using the data supplied from the switch 111 and outputs the generated plane to the combining unit 130. The plane of R view video output from the R video plane generating unit 162 is appropriately combined with other R view data by the combining unit 130. The combined plane is output to the display apparatus 3 as the data of an R image.

The elementary streams of the Base view video and the Dependent view video encoded using the H.264 AVC/MVC profile standard does not include information (a field) indicating whether the stream represents L view or R view.

Accordingly, by providing the view_type in a PlayList file, the recording apparatus enables the reproducing apparatus 1 to identify which one of the Base view video stream and the Dependent view video stream is a stream of L view and which one is a stream of R view.

The reproducing apparatus 1 can determine which one of the Base view video stream and the Dependent view video stream is a stream of L view and which one is a stream of R view and switch the output destination in accordance with the result of determination.

Even when each of the IG plane and the PG plane has L view and R view, the reproducing apparatus 1 can determine which video stream is a stream of L view or a stream of R view. Accordingly, the reproducing apparatus 1 can easily combine the planes of L view and combine the planes of R view.

In some cases, when a video signal is output using an HDMI cable, an L view signal needs to be differentiated from an R view signal and be output. In such a case, the reproducing apparatus 1 can meet the requirement.

The data obtained by decoding a packet of the Base view video stored in the DPB 151 may be differentiated from the data obtained by decoding a packet of the Dependent view video using the view_id in place of the PID.

When encoding is performed using the H.264 AVC/MVC profile standard, an Access Unit that forms an encoded stream has a view_id assigned thereto. By using the view_id, it can be determined to which view component each of the Access Units belongs.

Figure 26:
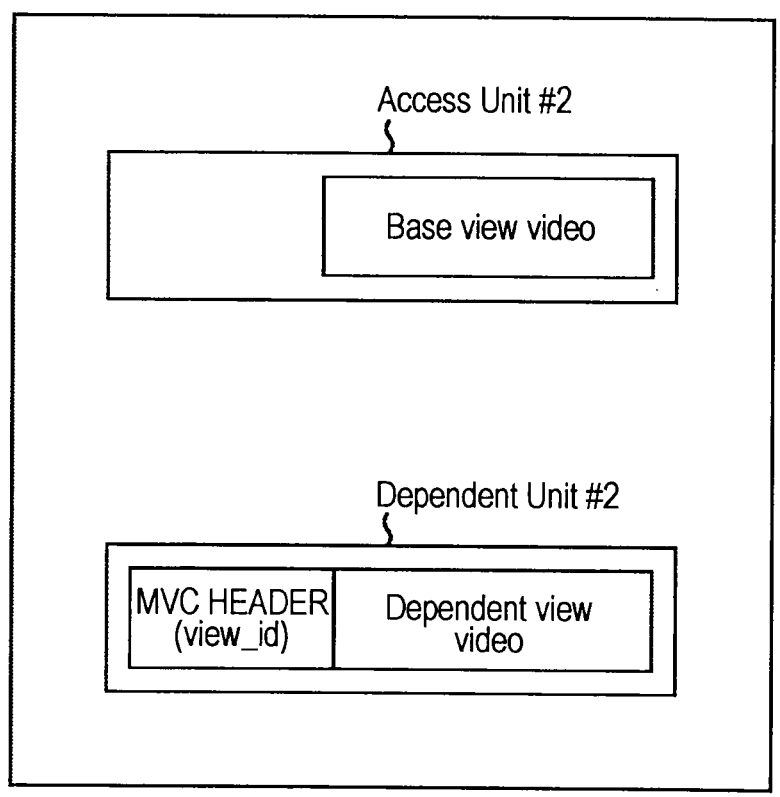
FIG. 26 illustrates an example of the Access Unit.

FIG. 26 illustrates an example of the Access Unit.

In FIG. 26, an Access Unit #1 is a unit including the data of the Base view video. A Dependent Unit #2 is a unit including the data of the Dependent view video. For example, the access unit (the dependent unit for Dependent view) is generated by combining the data of a picture so that access on a picture-by-picture basis is available.

When encoding is performed using the H.264 AVC/MVC profile standard, the data of a picture of each of the Base view video and the Dependent view video is contained in such a unit. As indicated by the Dependent Unit #2, when encoding is performed using the H.264 AVC/MVC profile standard, an MVC header is added to each of the view components. The MVC header includes a view_id.

In the example shown in FIG. 26, for the Dependent Unit #2, it can be determined that a view component stored in the unit is Dependent view video using the view_id.

However, as shown in FIG. 26, the Base view video which is a view component stored in the Access Unit #1 has no MVC header added thereto.

As noted above, the Base view video stream is data also used for 2D reproduction. Accordingly, in order to maintain the compatibility with 2D reproduction, an MVC header is not added to the Base view video when encoding is performed. Alternatively, an added MVC header is removed.

The reproducing apparatus 1 is set up in such a manner that the reproducing apparatus 1 considers that a view component without an MVC header added thereto has a view_id of 0 and is the Base view video. For the Dependent view video, a value other than 0 is set in the view_id when encoding is performed.

In this way, the reproducing apparatus 1 can identify the Base view video using the view_id having a value of 0. In contrast, the reproducing apparatus 1 can identify the Dependent view video using the view_id having an actually set value other than 0.

In the switch 111 shown in FIG. 25, discrimination between the data obtained by decoding a packet of the Base view video and the data obtained by decoding a packet of the Dependent view video may be made using such view_id.

[Example Configuration of Recording Apparatus]

Figure 27:
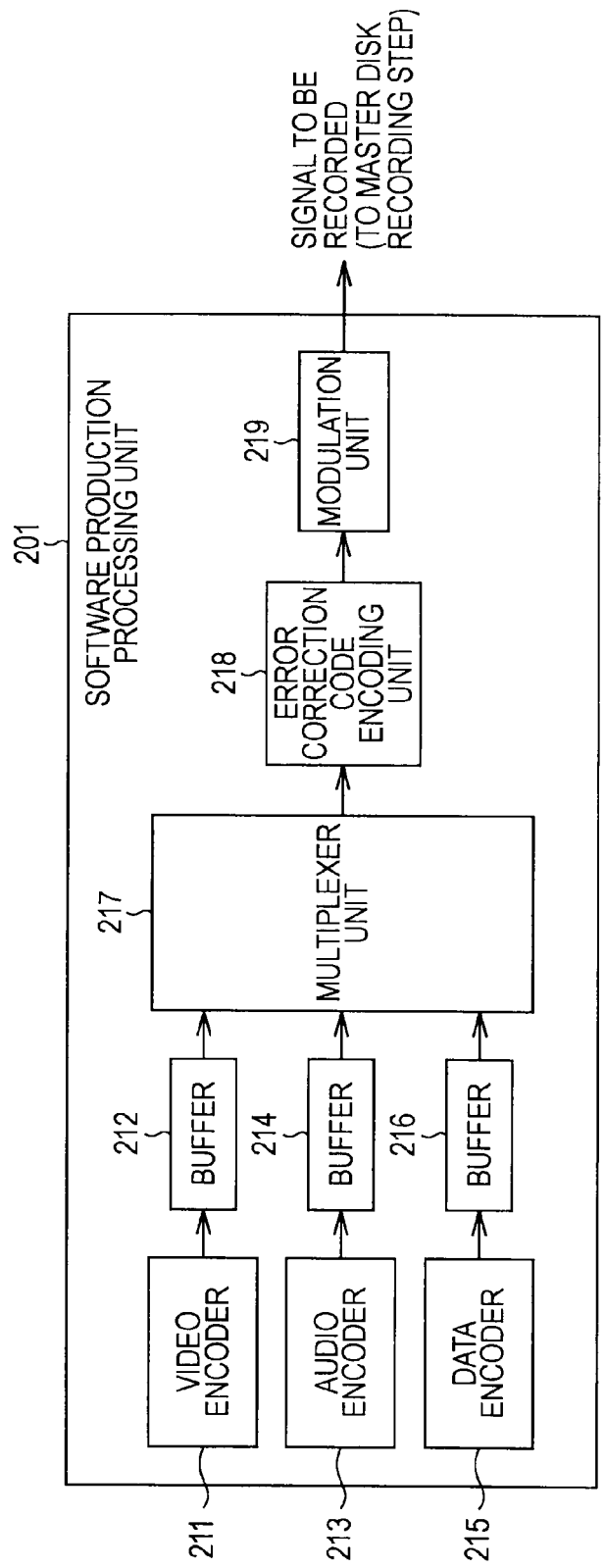
FIG. 27 is a block diagram of an example configuration of a software production processing unit.

FIG. 27 is a block diagram of an example configuration of a software production processing unit 201.

A video encoder 211 has a configuration similar to that of the MVC encoder 11 shown in FIG. 3. The video encoder 211 encodes a plurality of video data items using the H.264 AVC/MVC profile standard. Thus, the video encoder 211 generates a Base view video stream and a Dependent view video stream and outputs the generated streams to a buffer 212.

An audio encoder 213 encodes an input audio stream and outputs the encoded data to a buffer 214. An audio stream to be recorded on a disk together with the Base view video stream and the Dependent view video stream is input to the audio encoder 213.

A data encoder 215 encodes the above-described variety of data items other than the video and audio data (e.g., the PlayList file) and outputs data obtained through the encoding operation to a buffer 216.

For example, the data encoder 215 sets the value of application_type of the Clip Information file corresponding to the Sub TS including the Dependent view video stream to 8. "application_type=8" indicates an application that performs 3D reproduction using a Dependent view video stream.

In addition, the data encoder 215 sets, in the PlayList, SubPath_type having a value indicating whether the Dependent view video stream is multiplexed in the TS of the Base view video stream and at which location the Dependent view video stream is recorded. The location at which the Dependent view video stream is recorded is one of the optical disk 2 and the local storage 54.

Furthermore, when the reproducing apparatus 1 computes the Dependent view video stream using the ID of the Base view stream, the data encoder 215 sets a value x used for the computation at a predetermined location, such as in the STN_table( ).

The data encoder 215 sets, in the PlayList file, a view_type indicating whether the Base view video stream is a stream of L view or a stream of R view in accordance with encoding performed by the video encoder 211.

A multiplexer unit 217 multiplexes the video data, audio data, and data other than the stream data stored in the corresponding buffers into data together with a synchronization signal. Thereafter, the multiplexer unit 217 outputs the multiplexed data to an error correction code encoding unit 218.

The error correction code encoding unit 218 attaches the error correction code to the data multiplexed by the multiplexer unit 217.

A modulation unit 219 modulates the data supplied from the error correction code encoding unit 218 and outputs the modulated data. The output of the modulation unit 219 serves as software that is recorded on the optical disk 2 and that is reproducible by the reproducing apparatus 1.

The software production processing unit 201 having such a configuration is disposed in the recording apparatus.

Figure 28:
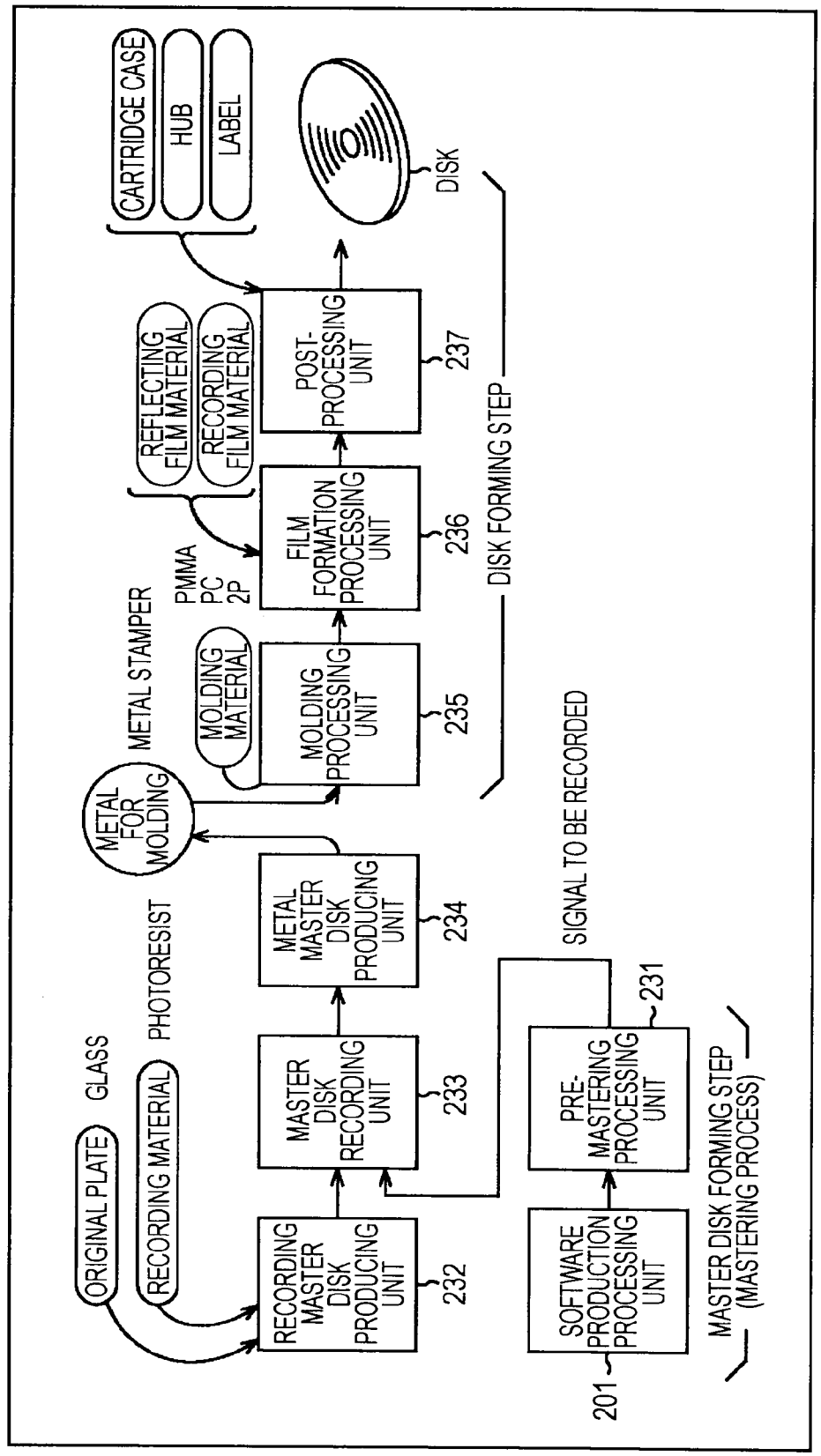
FIG. 28 illustrates example configurations including the software production processing unit.

FIG. 28 illustrates a variety of example configurations including the software production processing unit 201.

Part of the configuration shown in FIG. 26 may be disposed in the recording apparatus.

A recording signal generated by the software production processing unit 201 is subjected to a mastering process in a pre-mastering processing unit 231. Thus, a signal having a format to be recorded on the optical disk 2 is generated. The generated signal is supplied to a master disk recording unit 233.

A master disk is pre-mounted in a master disk producing unit 232. For example, the master disk is made of glass. A recording material, such as photoresist, is applied to a master disk. Thus, a recording master disk is produced.

In the master disk recording unit 233, a laser beam is modulated in accordance with the recording signal supplied from the pre-mastering processing unit 231 and is emitted to the photoresist applied on the master disk. In this way, the photoresist on the master disk is exposed in accordance with the recording signal. Subsequently, the master disk is developed so that pits appear on the master disk.

In a metal master disk producing unit 234, the master disk is subjected to, for example, an electroforming process. Thus, a metal master disk having the pits formed on the glass master disk transferred thereon is produced. Furthermore, a metal stamper is produced from the metal master disk. The metal stamper serves as a molding die.

In a molding processing unit 235, a material, such as PMMA (acrylic) or PC (polycarbonate), is injected to the mold using an injection method and immobilized. Alternatively, for example, 2P (ultraviolet curable resin) is applied to the metal stamper. Thereafter, the 2P is cured by emitting ultraviolet rays on the 2P. In this way, the pits formed on the metal stamper can be transferred onto a replica made of a resin.

In a film formation processing unit 236, a reflecting film is formed on the replica by evaporation or sputtering. Alternatively, a reflecting film may be formed on the replica by spin coating.

In a post-processing unit 237, processing regarding the inner and outer diameters of the disk is performed on the disk, and an additional necessary process, such as bonding of two disks, is performed. Thereafter, a label is bonded to the disk, and a hub is attached to the disk. Subsequently, the disk is disposed in a cartridge. In this way, the optical disk 2 having data reproducible by the reproducing apparatus 1 can be achieved.

[Location of view_type]

As illustrated in FIG. 20, the above description has been made with reference to the case in which the view_type indicating whether the Base view video stream is a stream of an L image or a stream of an R image is written in the PlayList. However, the view_type may be written in the location other than the PlayList.

For example, the Base view video stream and the Dependent view video stream may be multiplexed into the same TS or into different TSs. Thereafter, the TS or TSs are transmitted through broadcast waves or a network. In such a case, the view_type is written in, for example, PSI which is transmission information, the Base view video stream, or the Dependent view video stream (an elementary stream).

FIG. 29 illustrates an example in which the view_type is written in a PMT (Program Map Table) included in the PSI (Program Specific Information).

As shown in FIG. 29, as an MVC descriptor, MVC_video_stream_descriptor( ) may be newly defined. Thereafter, the view_type may be written in the MVC_video_stream_descriptor( ). Note that the value of the descriptor_tag is set to, for example, 65.

In such a case, the data encoder 215 of the software production processing unit 201 generates a PMT having the view_type written therein and outputs the generated PMT. The PMT output from the data encoder 215 is supplied to the multiplexer unit 217 via the buffer 216 and is multiplexed with the Base view video stream and the Dependent view video stream. A TS obtained through the multiplexing operation is transmitted through broadcast waves or a network.

Upon receiving the TS, the reproducing apparatus 1 determines whether the Base view video stream multiplexed in the TS is a stream of an L image or a stream of an R image on the basis of the view_type written in the PMT. Thereafter, the reproducing apparatus 1 switches the output destination of data of the result of decoding, which is illustrated in FIG. 25.

The view_type may be written in another location, such as a SIT (Selection Information Table), in place of the PMT.

Figure 30:
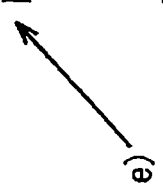
FIG. 30 illustrates an example in which the view_type is written in an elementary stream.

FIG. 30 illustrates an example in which the view_type is written in an elementary stream.

As shown in FIG. 30, the view_type can be written in MVC_video_stream_info( ) included in SEI. The SEI is additional information added to the data of each picture of the Base view video stream and the Dependent view video stream. The SEI including the view_type is added to each picture of at least one of the Base view video stream and the Dependent view video stream.

Figure 31:
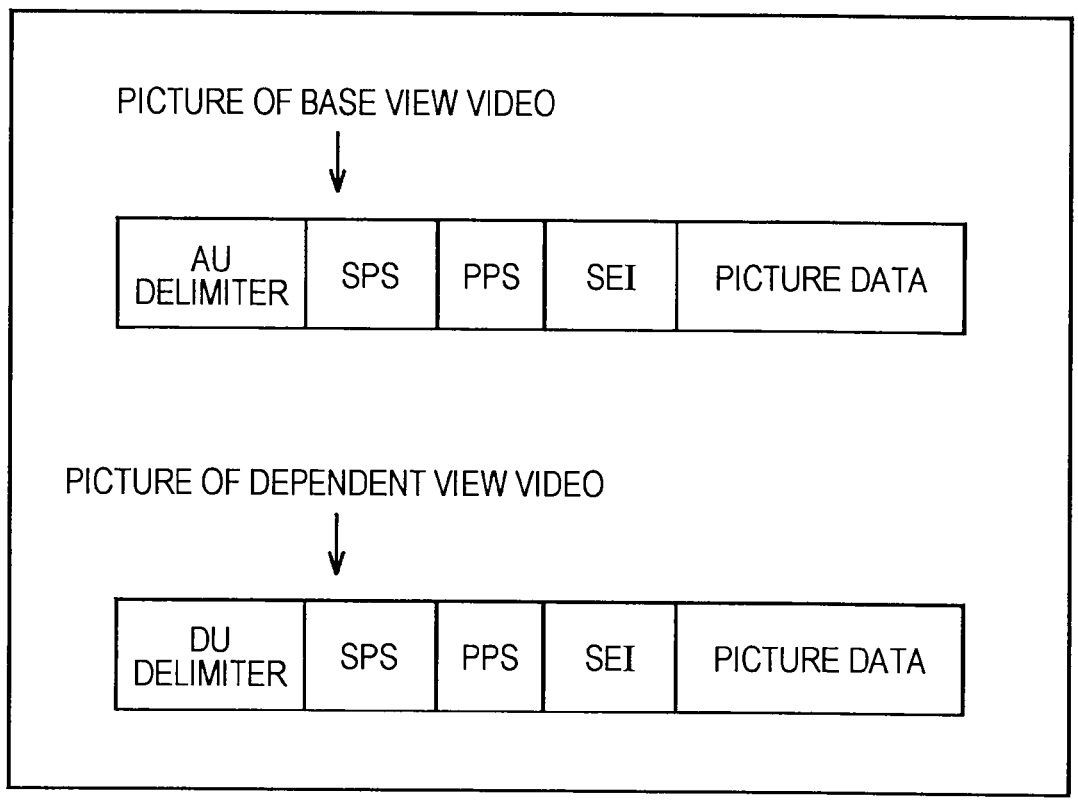
FIG. 31 illustrates the structure of the Access Unit.

FIG. 31 illustrates the structure of the Access Unit.

As shown in FIG. 31, the Access Unit of the Base view video including the data of a picture of the Base view video stream has a structure that is the same as that of the Dependent Unit of the Dependent view video including the data of a picture of the Dependent view video stream. Each of the Access Unit includes a delimiter that indicates a boundary between the Access Units, SPS, PPS, SEI, and the picture data. For example, the MVC header illustrated in FIG. 26 is added to the picture data of the Dependent Unit of the Dependent view video.

In such a case, the data encoder 215 of the software production processing unit 201 generates SEI including the view_type written therein and outputs the SEI to the video encoder 211 via a certain route (not shown). The video encoder 211 adds the SEI output from the data encoder 215 to the data of each picture of the Base view video stream and the Dependent view video stream obtained by encoding L image data and R image data in accordance with the H.264 AVC/MVC profile standard, in a manner as illustrated in FIG. 31.

After the Base view video stream and the Dependent view video stream formed from the picture data with the SEI having the view_type written therein are multiplexed, the Base view video stream and the Dependent view video stream are transmitted via broadcasting waves or a network or are recorded on a recording medium.

After reading out the SEI, the reproducing apparatus 1 determines whether the Base view video stream is a stream of an L image or a stream of an R image on the basis of the value of the view_type written in the SEI. Thereafter, the reproducing apparatus 1 performs the above-described processing illustrated in FIG. 25, such as switching the output destination of the data that is the result of decoding.

The above-described series of processes can be executed not only by hardware but also by software. When the above-described series of processes are executed by software, the programs of the software are installed from a program recording medium into a computer incorporated in dedicated hardware or a general-purpose personal computer.

Figure 32:
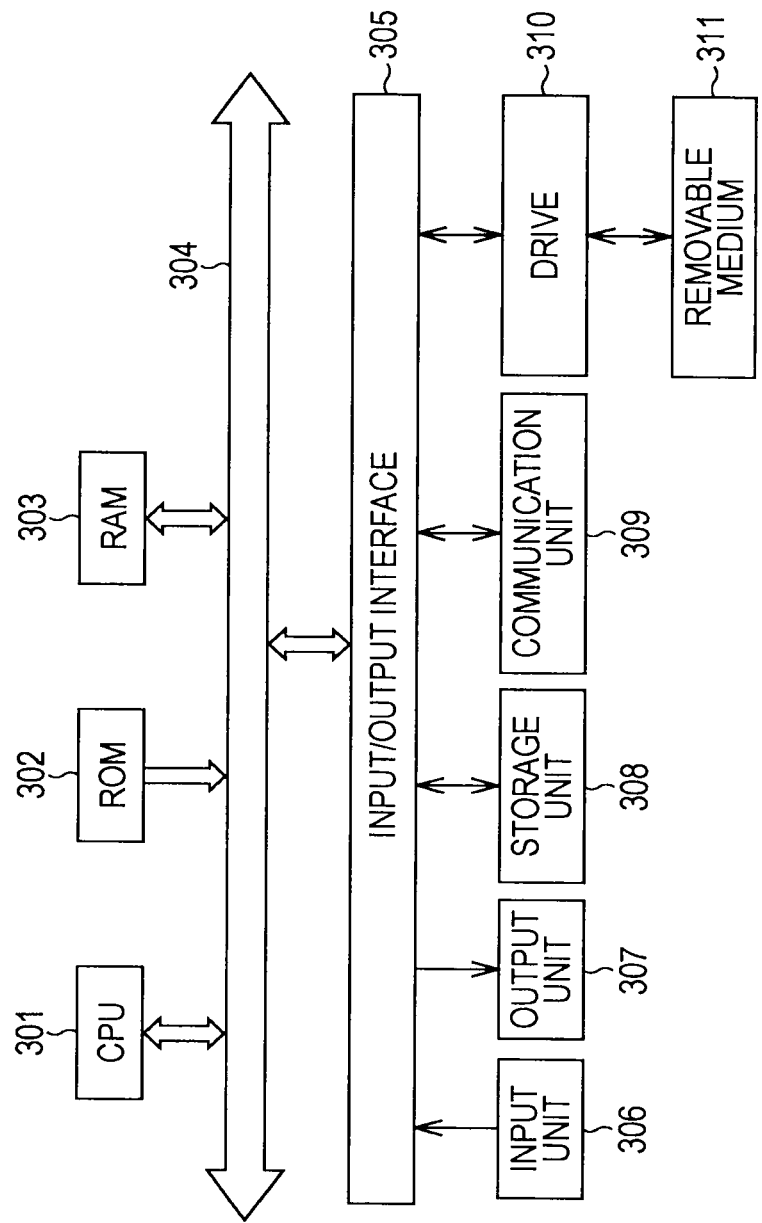
FIG. 32 is a block diagram of an example hardware configuration of a computer.

FIG. 32 is a block diagram of an example hardware configuration of a computer that performs the above-described series of processes using programs.

A CPU (Central Processing Unit) 301, a ROM (Read Only Memory) 302, and a RAM (Random Access Memory) 303 are connected to one another via a bus 304.

In addition, an input/output interface 305 is connected to the bus 304. The input/output interface 305 has an input unit 306 including, for example, a keyboard and a mouse and an output unit 307 including, for example, a display and a speaker connected thereto. In addition, a storage unit 308 including a hard disk and a nonvolatile memory, a communication unit 309 including, for example, a network interface, and a drive 310 for driving a removable medium 311 are connected to the bus 304.

In a computer having the above-described configuration, for example, the CPU 301 loads a program stored in the storage unit 308 into the RAM 303 via the input/output interface 305 and the bus 304. Thereafter, the above-described series of processes are performed.

The programs to be executed by the CPU 301 are supplied via, for example, the removable medium 311 that stores the programs or a wired or wireless transmission medium, such as a local area network, the Internet, or digital broadcasting and are installed in the storage unit 308.

Note that the programs executed by the computer may be programs executed in the above-described sequence, but also programs that may be executed in parallel or at appropriate points in time, such as the points in time when called.

It should be noted that embodiments of the present invention are not limited to the above-described embodiments. Various modifications can be made without departing from the principles and concepts of the invention.

REFERENCE SIGNS LIST 1 reproducing apparatus
2 optical disk
3 display apparatus
11 MVC encoder
21 H.264/AVC encoder
22 H.264/AVC decoder
23 Depth computing unit
24 Dependent view video encoder
25 multiplexer
51 controller
52 disk drive
53 memory
54 local storage
55 Internet interface
56 decoder unit
57 operation input unit

The invention claimed is:

1. A reproduction apparatus comprising:
a reading unit which reads a basic stream and an expanded stream, which have been obtained by encoding movie data for a left eye and movie data for a right eye by H.264 AVC/MVC, from a recording medium and reads a PlayList file, in which one-bit viewing point information indicating whether the basic stream is a stream of the movie data for the left eye or a stream of the movie data for the right eye is described in AppInfoPlayList( ) which manages reproduction of the basic stream and the expanded stream, from the recording medium;
a decoding unit which decodes the basic stream and the expanded stream; and
an output unit which outputs first movie data, which has been obtained by decoding the basic stream, as one of the movie data for the left eye and the movie data for the right eye and outputs second movie data, which has been obtained by decoding the expanded stream, as the other movie data.

2. The reproduction apparatus according to claim 1, further comprising:
a first buffer which records therein the basic stream read from the recording medium; and
a second buffer which records therein the expanded stream read from the recording medium,
wherein the decoding unit decodes the basic stream recorded in the first buffer and decodes the expanded stream recorded in the second buffer.

3. The reproduction apparatus according to claim 2, further comprising:
a third buffer which records therein the first movie data obtained by decoding the basic stream and the second movie data obtained by decoding the expanded stream,
wherein the output unit outputs the first movie data recorded in the third buffer as the movie data for the left eye and outputs the second movie data as the movie data for the right eye when a value of the viewing point information is zero, and outputs the first movie data recorded in the third buffer as the movie data for the right eye and outputs the second movie data as the movie data for the left eye when the value of the viewing point information is one.

4. A reproduction method comprising the steps of:
reading a basic stream and an expanded stream, which have been obtained by encoding movie data for a left eye and movie data for a right eye by H.264 AVC/MVC, from a recording medium;
reading a PlayList file, in which one-bit viewing point information indicating whether the basic stream is a stream of the movie data for the left eye or a stream of the movie data for the right eye is described in AppInfoPlayList( ), which manages reproduction of the basic stream and the expanded stream, from the recording medium;
decoding the basic stream and the expanded stream; and
outputting first movie data, which has been obtained by decoding the basic stream, as one of the movie data for the left eye and the movie data for the right eye and outputting second movie data, which has been obtained by decoding the expanded stream, as the other movie data.

5. A recording method comprising the steps of:
creating a basic stream and an expanded stream by encoding left eye movie data and right eye movie data using H.264 AVC/MVC;
creating a PlayList file for managing reproduction of the basic stream and the expanded stream, in which one-bit viewing point information is described in an AppInfoPlayList( ) the viewing point information indicating which one of a stream of the left eye movie data and a stream of right eye movie data the basic stream is, the viewing point information causing a reproduction apparatus to function for outputting movie data obtained by decoding the basic stream as one of the left eye movie data and the right eye movie data and outputting movie data obtained by decoding the expanded stream as the other movie data; and recording the created basic stream, the expanded stream, and the PlayList file in a recording medium.

* * * * *